(12) United States Patent
Ishijima et al.

(10) Patent No.: US 7,938,490 B2
(45) Date of Patent: May 10, 2011

(54) SEAT

(75) Inventors: Takahiro Ishijima, Aichi (JP); Satoshi Akiba, Nagoya (JP); Hiroshi Mizobata, Toyota (JP)

(73) Assignees: Toyota Jidosha Kabushiki Kaisha, Toyota-shi, Aichi-ken (JP); Toyota Boshoku Kabushiki Kaisha, Aichi (JP)

( * ) Notice: Subject to any disclaimer, the term of this patent is extended or adjusted under 35 U.S.C. 154(b) by 235 days.

(21) Appl. No.: 12/161,873

(22) PCT Filed: Jan. 25, 2007

(86) PCT No.: PCT/JP2007/051181
§ 371 (c)(1),
(2), (4) Date: Jul. 23, 2008

(87) PCT Pub. No.: WO2007/086466
PCT Pub. Date: Aug. 2, 2007

(65) Prior Publication Data
US 2009/0026825 A1 Jan. 29, 2009

(30) Foreign Application Priority Data

Jan. 27, 2006 (JP) ................................ 2006-019263

(51) Int. Cl.
*B60N 2/12* (2006.01)
*B60N 2/16* (2006.01)
*B60N 2/18* (2006.01)
*B60N 2/20* (2006.01)

(52) U.S. Cl. ................ 297/358; 297/344.1; 297/344.11; 297/344.12; 297/344.13; 297/344.14; 297/344.15; 297/361.1; 297/463.1

(58) Field of Classification Search ............... 297/463.1, 297/463.2, 358, 361.1, 344.1, 344.11, 344.12, 297/344.13, 344.14, 344.15, 354.1, 354.12
See application file for complete search history.

(56) References Cited

U.S. PATENT DOCUMENTS

| 3,953,069 A | 4/1976 | Tamura et al. |
| 3,957,312 A | 5/1976 | Bonnaud |
| 3,958,828 A | 5/1976 | Ishida et al. |

(Continued)

FOREIGN PATENT DOCUMENTS

DE 33 19 397 11/1984

(Continued)

OTHER PUBLICATIONS

T. Ishijima et al., "Seat," U.S. Appl. No. 12/159,808, filed Jul. 1, 2008.

(Continued)

*Primary Examiner* — Rodney B White
(74) *Attorney, Agent, or Firm* — Finnegan, Henderson, Farabow, Garrett & Dunner, LLP

(57) ABSTRACT

A seat may be obtained with improved operability of plural adjustable units.
A vehicle seat 10 is provided with: a seat lifter 22 provided to a seat body for sitting on, adjustable by transmitted operation force; a reclining mechanism 20 provided to the seat body, adjustable by transmitted operation force; and an operation lever 30, to which operation force from operation by a seat occupant is input; and a switching mechanism 50 that is able to selectively switch between a first state in which operation force of the operation lever 30 is able to be transmitted to the seat lifter 22, and a second state in which operation force of the operation lever 30 is able to be transmitted to the reclining mechanism 20.

6 Claims, 17 Drawing Sheets

U.S. PATENT DOCUMENTS

| | | | |
|---|---|---|---|
| 4,146,267 A | 3/1979 | Mori et al. | |
| 4,437,703 A | 3/1984 | Nishikori et al. | |
| 4,461,511 A | 7/1984 | Berneking et al. | |
| 4,466,661 A | 8/1984 | Narita | |
| 4,580,838 A | 4/1986 | Schöttker et al. | |
| 4,653,807 A | 3/1987 | Hirose et al. | |
| 4,700,989 A | 10/1987 | Ercilla | |
| 4,995,669 A | 2/1991 | Croft | |
| 5,393,116 A | 2/1995 | Bolsworth et al. | |
| 5,597,206 A | 1/1997 | Ainsworth et al. | |
| 5,611,599 A | 3/1997 | Baloche et al. | |
| 5,700,055 A | 12/1997 | Davidson et al. | |
| 5,788,330 A | 8/1998 | Ryan | |
| 5,918,940 A | 7/1999 | Wakamatsu et al. | |
| 6,120,098 A | 9/2000 | Magyar et al. | |
| 6,402,249 B1 | 6/2002 | Rohee et al. | |
| 6,619,744 B2 | 9/2003 | Reubeuze | |
| 6,663,180 B2 | 12/2003 | LeTournoux | |
| 7,293,838 B2 | 11/2007 | Sugama et al. | |
| 7,472,963 B2* | 1/2009 | Jeong | 297/463.1 |
| 7,494,186 B2 | 2/2009 | Paing et al. | |
| 2009/0026791 A1* | 1/2009 | Ishijima et al. | 297/358 X |
| 2009/0026825 A1 | 1/2009 | Ishijima et al. | |
| 2009/0058158 A1 | 3/2009 | Sobieski | |
| 2010/0109406 A1* | 5/2010 | Ueda | 297/358 |

FOREIGN PATENT DOCUMENTS

| | | |
|---|---|---|
| DE | 100 15 772 | 6/2001 |
| FR | 2 770 181 | 4/1999 |
| GB | 2 144 511 | 3/1985 |
| JP | S61-5976 | 1/1986 |
| JP | 63-36423 | 9/1988 |
| JP | 63-60404 | 11/1988 |
| JP | 2-36757 | 10/1990 |
| JP | 4-854 | 1/1992 |
| JP | 8-26007 | 1/1996 |
| JP | 8-268128 | 10/1996 |
| JP | 2000-255295 | 9/2000 |
| JP | 2001-130294 | 5/2001 |
| WO | WO 2007/086465 A1 | 8/2007 |

OTHER PUBLICATIONS

K. Ueda, "Seat," U.S. Appl. No. 12/161,361, filed Jul. 18, 2008.
Supplementary European Search Report dated Jun. 15, 2009.
T. Ishijima et al., "Seat," U.S. Appl. No. 12/161,856, filed Jul. 23, 2008.

* cited by examiner

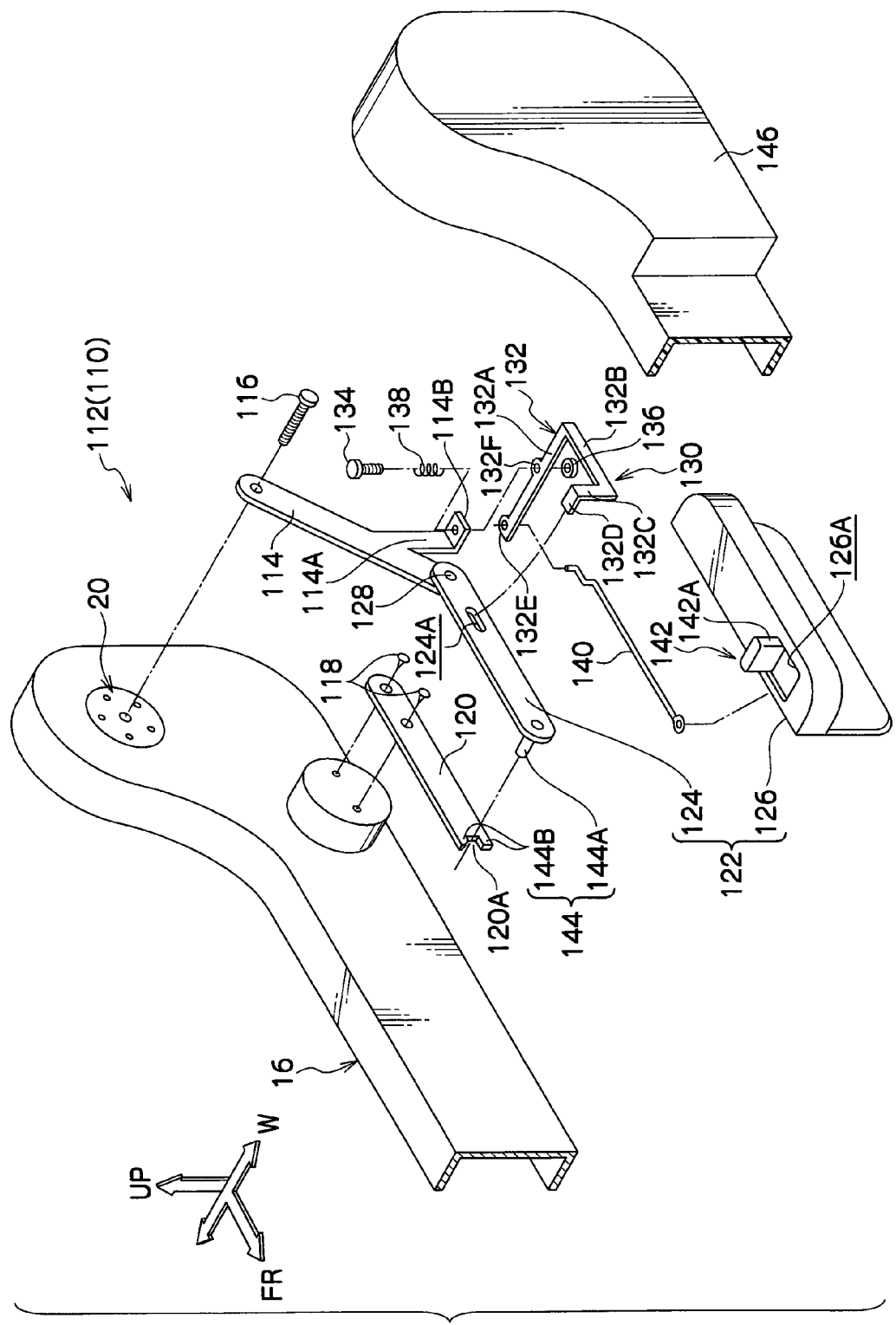

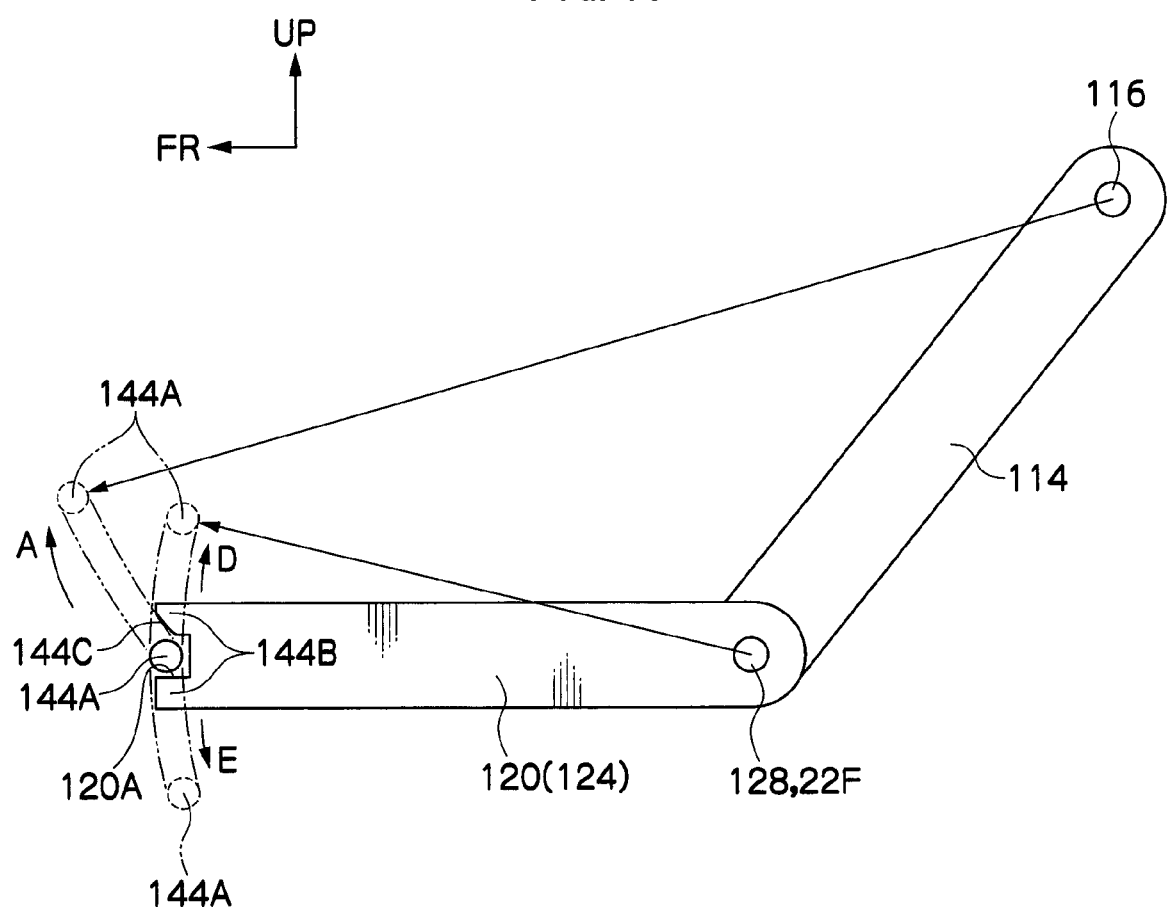

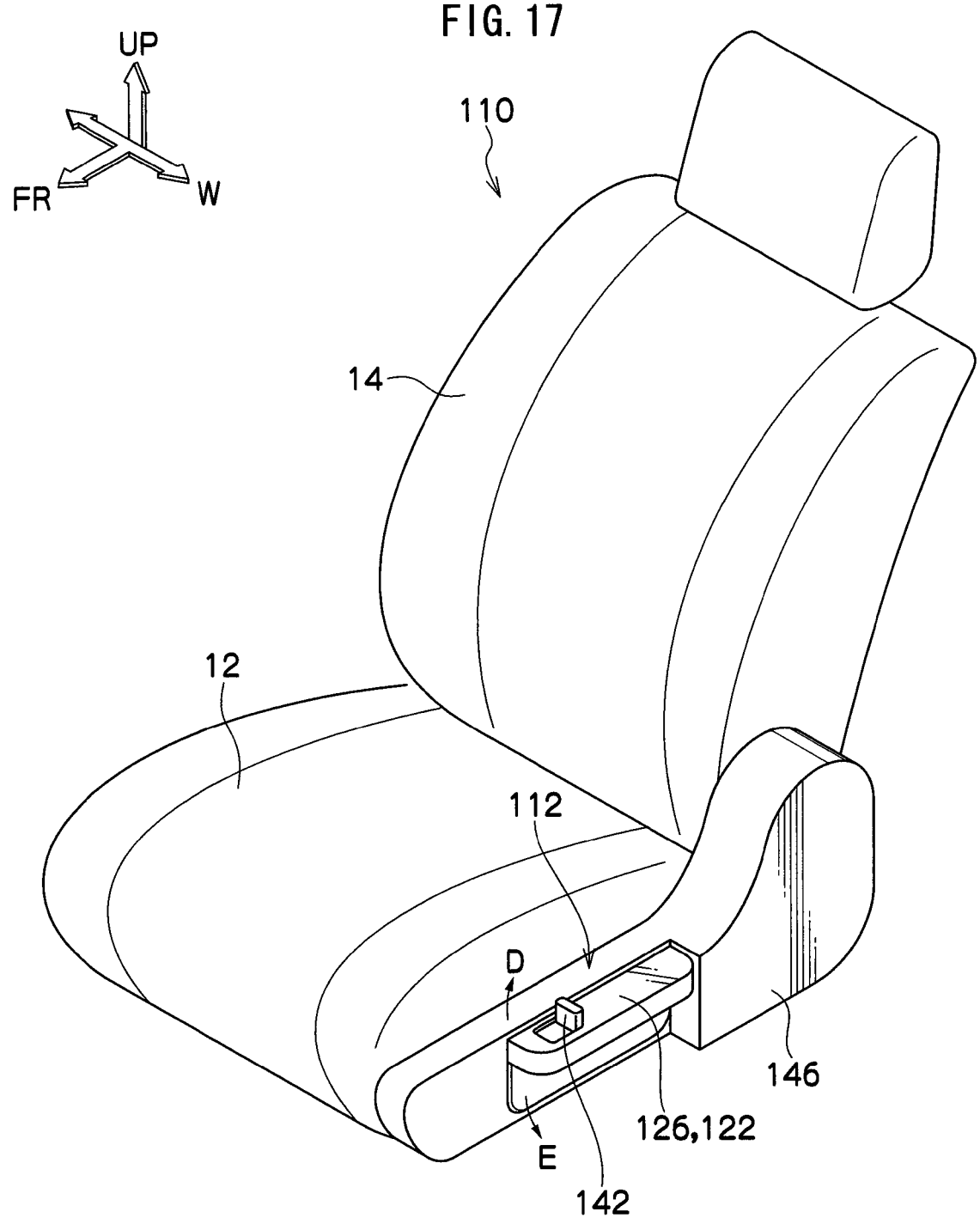

SEAT

CROSS-REFERENCE TO RELATED APPLICATIONS

This application is a national phase application of International Application No. PCT/JP2007/051181, filed Jan. 25, 2007, and claims the priority of Japanese Application No. 2006-019263, filed Jan. 27, 2006, the contents of both of which is incorporated herein by reference.

TECHNICAL FIELD

The present invention relates to a seat such as, for example, a seat mounted to an automobile for an occupant to sit on.

RELATED ART

Vehicle seats are known that are provided with an operation lever for releasing the lock of a reclining mechanism and making the adjustment of the angle of a seat back possible, and a knob for adjusting the height of a seat cushion rear portion (see, for example, Japanese Patent Application Laid-Open (JP-A) No. 2001-130294). As the operation lever and the knob, these are each disposed at a distance from each other at a seat width direction outside edge portion, and are able to be operated independently so that they do not interfere with each other.

Vehicle seats are also known that are configured with a reclining lever that is operable in two stages, at the first stage of operation the lock of a reclining mechanism is released and adjustment of the angle of the seat back is made possible, and at the second stage of operation the adjustment of the angle of the seat back remains possible but the seat is configured such that a height lever is engaged and the seat is raised (see, for example, JP-A No. H8-26007).

DISCLOSURE OF THE INVENTION

Problem to be Solved by the Invention

However, in the first of the above described technologies, since the operation lever and the knob are provided as separate items, it is difficult to dispose both of these in positions that have good operability. On the other hand in the second of the above described technologies, since the release of the lock of the height lock mechanism (operation of the height lever) cannot be carried out independently of the release of the reclining lock, this does not contribute to increased operability.

Consideration has been made of the above points and an object of the present invention is to provide a seat with that is able to improve the operability of plural adjustable units.

Method of Solving the Problem

A seat of a first aspect of the present invention includes: a first adjustable unit, provided to a seat body that is for sitting on, the first adjustable unit being adjusted by transmitted operation force; a second adjustable unit, provided to the seat body, the second adjustable unit being adjusted by transmitted operation force; an operation member, input with operation force from operation by a seat occupant; and a switching device, capable of selectively taking up a first state in which operation force of the operation member is able to be transmitted to the first adjustable unit, and a second state in which operation force of the operation member is able to be transmitted to the second adjustable unit.

By the above aspect, when the switching device takes up the first state, if the operation member is operated, this operation force is transmitted to the first adjustable unit, and the first adjustable unit is adjusted, or by this operation force the first adjustable unit is placed in a state in which it is adjustable (a lock released state or the like, for example). On the other hand, when the switching device takes up the second state, if the operation member is operated, this operation force is transmitted to the second adjustable unit, and the second adjustable unit is adjusted, or by this operation force the second adjustable unit is placed in a state in which it is adjustable (a lock released state or the like, for example).

Thereby, the first adjustable unit and the second adjustable unit may be selectively, that is to say independently, adjusted by a single operation member. In doing so, in comparison to a configuration in which two operation members are provided for independent operation of the first adjustable unit and the second adjustable unit, limitations are reduced for the placement and size of the operational region of a seat occupant, and an increase in the degrees of freedom for design may be achieved. Therefore, for example, by disposing the single operation member, which is capable of independently operating the first adjustable unit and the second adjustable unit, in a position at the seat cushion that has good operability, both a height adjusting mechanism and an angle adjusting mechanism may be operated with good operability.

In this manner, the seat of the above described aspect is able to improve the operability of plural adjustable units. It should be noted that there may be three or more adjustable units and the operation force imparting unit may be provided with the functionality of three or more operation force imparting units corresponding thereto.

In the above aspect, it is preferable that a switching operation portion of the switching device is provided to the operation member.

By the above aspect, since the switching operation portion of the switching device is provided to the operation member, both switching of the object to be operated and operation of the operation member may be carried out with one hand, and operability may be further improved.

In the above aspect, it is preferable that the switching device includes: a force transmission portion, engaging in the first state so that operation force is transmittable to an operation force input portion of the first adjustable unit, and engaging in the second state so that operation force is transmittable to an operation force input portion of the second adjustable unit; and an interlocking portion, connecting the switching operation portion and the force transmission portion, and switching the force transmission portion between being in the first state or being in the second state according to the operation state of the switching operation portion.

By the above aspect, when a seat occupant operates the switching operation portion of the switching device, the interlocking portion displaces the force transmission portion and switches from the first state to the second state, or from the second state to the first state. By providing the interlocking portion, the switching operation portion may be disposed in a desired position, and operability may be further improved. It should be noted that both operation from the first state to the second state, and operation from the second state to the first state may both be configured so as to be carried out by the seat occupant (by operation force imparted thereby), or it may be configured such that the first state or the second state is normally (when there is no operation of the switching portion) maintained by using, for example, a biasing member.

In the above aspect, it is preferable that the interlocking portion is configured such that a displacement direction of the force transmission portion during switching between the first state and the second state is different from the operation direction of the switching operation member.

I By the above aspect, since the interlocking portion switches the operation direction of the switching operation portion to that of the force transmission portion switching direction, the degrees of freedom for design are increased for the force transmission portion that selectively transmits operation force to the first adjustable unit and second adjustable unit. Thereby, an operation force transmission structure corresponding to various adjustable units may be realized. Also, setting of the operation force and operation stroke of the switching operation portion is enabled.

In the above aspect, it is preferable that in the force transmission portion, the portion thereof engaging the first adjustable unit in the first state is different from the portion thereof engaging the second adjustable unit in the second state.

By the above aspect, since the portion of the force transmission portion engaging the first adjustable unit in the first state is different from the portion thereof engaging the second adjustable unit in the second state, the degrees of freedom for design are increased for the force transmission portion that selectively transmits operation force to the first adjustable unit and the second adjustable unit. Thereby, an operation force transmission structure corresponding to various adjustable units may be realized.

In the above aspect, it is preferable that the operation force input portion of the first adjustable unit includes a first arm that is able to rotate about an axis along the seat width direction; the operation force input portion of the second adjustable unit includes a second arm that is able to rotate about an axis that is parallel to the rotational axis of the first arm; and the operation member is connected to a portion that is separated from the rotational axis of the second arm, allowing relative angular displacement with respect to the second arm, and in a non-operation position the operation member is disposed so that the portion connected to the second arm is coaxial to the rotational axis of the first arm. Also, the force transmission portion of the switching device includes: a first engaging portion that in the first state permits relative angular displacement of the operation member with respect to the second arm and in the second state restricts relative angular displacement of the operation member with respect to the second arm; and a second engaging portion that is provided between the operation member and the first arm, and that engages with the first arm when the operation member rotates about the rotational axis of the first arm, and that has engagement with the first arm released when the operation member rotates about the rotational axis of the second arm.

By the above aspect, when operating the operation member in a case where the switching device has, by the first engaging portion, taken up the first state permitting relative angular displacement of the operation member and the second arm, the operation member rotates about the rotational axis of the first arm while carrying out relative angular displacement with respect to the second arm. When this occurs, since the first arm is engaged with the operation member, the first arm rotates following the rotation of the operation member and the first arm rotates about its own axis. Therefore, operation force of the operation member is transmitted to the first adjustable unit, and there is no transmission of operation force of the operation member to the second adjustable unit.

On the other hand, when operating the operation member when the switching device has, by the first engaging portion, taken up the second state restricting relative angular displacement of the operation member and the second arm, the operation member rotates as one with the second arm about the rotational axis of the second arm. When this occurs, since in the second engaging portion, engagement of the first arm and the operation member is released, there is no rotation of the first arm. Therefore, operation force from the operation member is transmitted to the second adjustable unit, and no operation force from the operation member is transmitted to the first adjustable unit.

In this manner, a configuration may be obtained in which the operation path of the operation member is different when adjusting the first adjustable unit to that when adjusting the second adjustable unit, while still providing a common operation member.

In the above aspect, it is preferable that one of the first adjustable unit or the second adjustable unit is a height adjustment mechanism for adjusting the position in the up-down direction of the seat body; and the other of the first adjustable unit or the second adjustable unit is a reclining mechanism for switching between a locked state of an angle of a seat back with respect to a seat cushion, and a lock released state thereof.

By the above aspect, since a reclining mechanism and a height adjusting mechanism may be operated by a common operation member, in comparison with configuration in which separate independent operation members are provided, there are few limitations to the disposition, dimensions and shape of the operation member. Therefore, an operation member may be disposed in a place with good operability for a seat occupant, and good operability of both a reclining mechanism and a height adjusting mechanism may be realized.

In the above aspect, it is preferable that the operation member is disposed to the outside of the seat body in the seat width direction, so as to operate the height adjusting mechanism by operating in the seat up-down direction, and so as to operate the reclining mechanism by operating in the seat up direction.

By the above aspect, the seat height is adjusted when the operation member (all of or an end portion thereof) is operated in the up-down direction when in the height adjusting mechanism selected state. When the operation member is operated upward, for example, the seat is raised, and when the operation member is operated downward the seat is lowered, thereby natural adjustment of the height may be carried out without any feeling of awkwardness. However, when the operation member (all of or an end portion thereof) is lifted when in the reclining mechanism selected state, the lock of the reclining mechanism is released and the seat back angle (tilt inclination) may be adjustable. In the present seat, by using the switching device, the operation direction of the common operation member for the height adjusting mechanism and the reclining mechanism may be set as the common up-down direction, and an operation feeling is enabled with an operability without imparting any feeling of awkwardness to the seat occupant (operator).

In the above aspect, it is preferable that the switching device switches between: a switching state maintaining a non-operation state of the switching portion in which the operation force of the operation member is able to be transmitted to the reclining mechanism; and a state in which the switching portion is operated and the operation force of the operation member is able to be transmitted to the height adjusting mechanism.

By the above aspect, when the operation member is operated in a predetermined direction (upward direction, for example) without operation of the switching operation member, the lock of the reclining mechanism is released. However, when the operation member is operated in a predetermined direction (up-down direction, for example) after the switching operation portion operated, or while operating the switching operation portion, the seat height is adjusted. Thereby, even if the seat occupant contacts the operation member when sitting down or getting up, unintentional operation of the height adjusting mechanism may be avoided.

EFFECT OF THE INVENTION

The seat according to the present invention, as has been explained above, has the superior effect of being able to improve the operability of plural adjustable units.

BRIEF DESCRIPTION OF THE DRAWINGS

FIG. 13 is an exploded perspective view of an operation force imparting unit of a vehicle seat according to a third exemplary embodiment of the present invention;

FIG. 16 is a side view for explaining the operation of a selectable engaging portion configuring an operation force imparting unit of a vehicle seat according to the third exemplary embodiment of the present invention;

FIG. 17 is a perspective view showing the overall configuration of a vehicle seat according to the third exemplary embodiment of the present invention;

BEST MODE OF IMPLEMENTING THE INVENTION

Explanation will now be given regarding the vehicle seat 10 as a seat according to a first exemplary embodiment of the present invention, with reference to FIGS. 1 to 7. It should be noted that in each of the figures the appropriately shown arrow FR, arrow UP and arrow W represent the front direction (direction of progression) of an automobile to which the vehicle seat 10 has been applied, the up direction thereof and the vehicle width direction, and these match the front direction, up direction and width direction of the vehicle seat 10. When reference is simply made below to the front-rear direction, up-down direction and width direction this indicates respective directions with reference to the above described vehicle seat (automobile).

Figure 5:
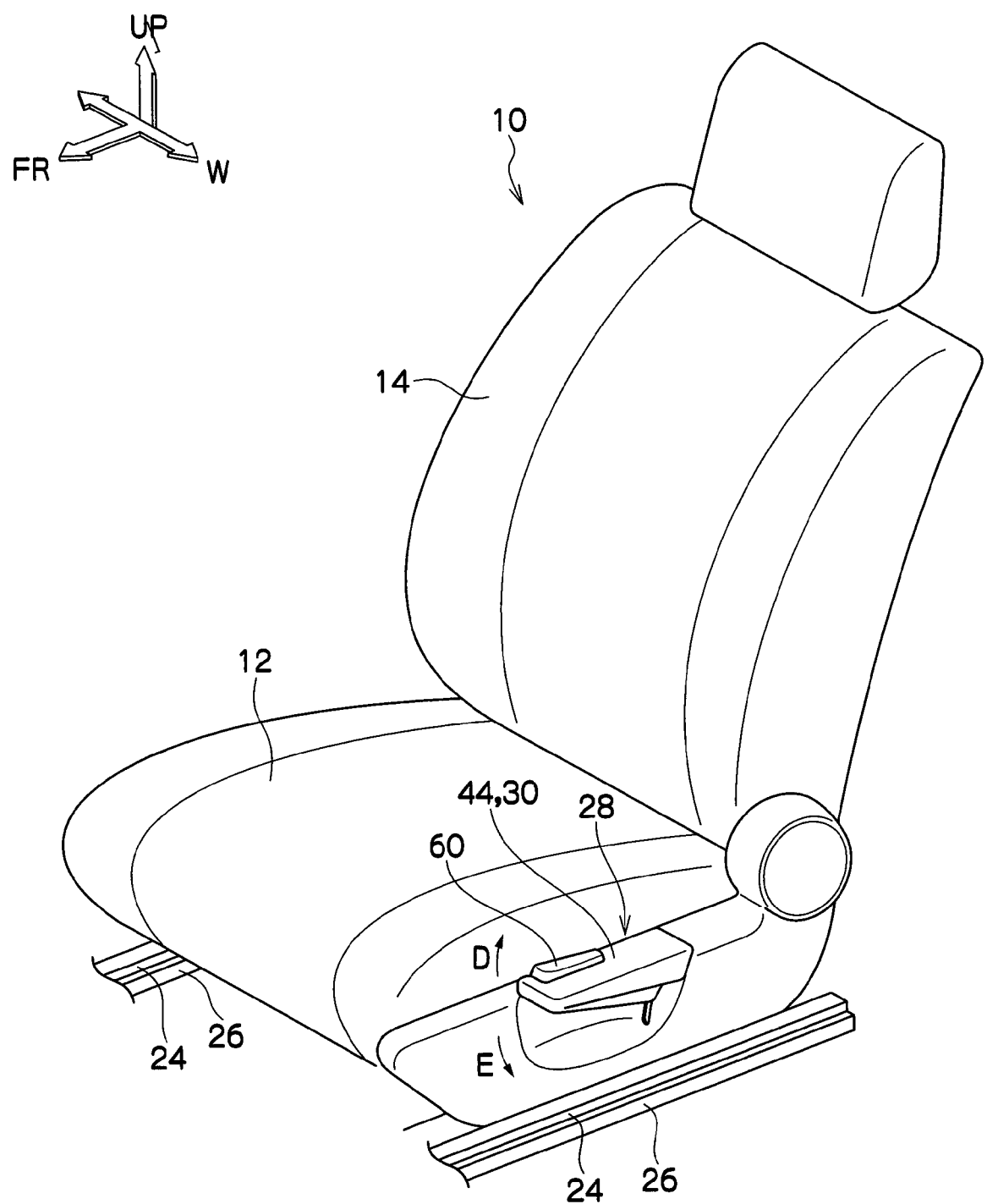
FIG. 5 is perspective view showing the overall configuration of a vehicle seat according to the first exemplary embodiment of the present invention.
Figure 7:
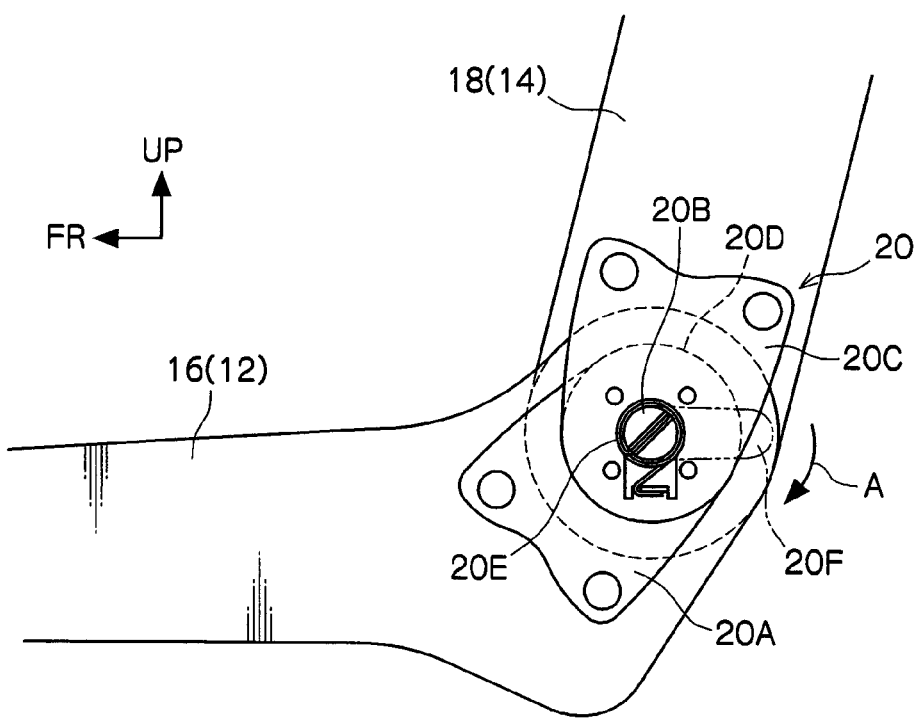
FIG. 7 is a side view of a reclining mechanism of a vehicle seat according to the first exemplary embodiment of the present invention.

FIG. 5 shows an outline of the overall configuration of the vehicle seat 10 in perspective view. As shown in the figure, the vehicle seat 10 is provided with a seat cushion 12 that is for an occupant sitting on and a seat back 14, supporting the upper body of a seated occupant from the rear. As shown in FIG. 7, the back edge portion of a seat cushion frame 16 configuring the seat cushion 12, and the bottom edge portion of a seat back frame 18 configuring the seat back 14, are connected together, in such a way that the relative angle therebetween may be adjusted, through reclining mechanisms 20 serving as angle adjusting mechanisms. There is a reclining mechanism 20 provided at both sides in the width direction, and the reclining mechanisms 20 are coupled together by a non illustrated interlocking mechanism.

As shown in FIG. 7, the reclining mechanism 20 is configured including main components of: a cushion side bracket 20A, which is fixed to the seat cushion frame 16; a back side bracket 20C, which is connected to the cushion side bracket 20A through a reclining shaft 20B and is also fixed to the seat back frame 18; a lock connecting portion 20D, which has the relative angle of the cushion side bracket 20A and the back side bracket 20C adjustable in plural stages, or continuously adjustable, about the reclining shaft 20B, and which may be locked at a desired angle; and a torsion spring 20E, which inhibits relative angular displacement between the cushion side bracket 20A and the back side bracket 20C, and urges the lock connecting portion 20D to the lock side. Also, the reclining mechanism 20 that is on one side in the seat width direction (on the vehicle width direction outside, for example) is provided with a lock release arm 20F that has been connected at one end in the length direction thereof to the reclining shaft 20B and is rotatable as one therewith. Since the lock connecting portion 20D may be obtained from various known structures, explanation of the structure thereof will be omitted.

This pair of reclining mechanisms 20 is configured so that, when the lock connecting portion 20D is in the locked state, a desired angle of inclination of the seat back 14 (seat back frame 18) with respect to the seat cushion 12 (seat cushion frame 16) is maintained. Furthermore, when in the pair of reclining mechanisms 20 the lock release arm 20F rotates in the direction of arrow A, as shown in FIG. 7, against the biasing force of the torsion spring 20E, then the respective lock connecting portions 20D are released from the locked state by the rotation directly, or by the rotation transmitted by the interlocking mechanism.

There is a non illustrated return spring disposed between the seat cushion 12 and the seat back 14, and when each of the reclining mechanisms 20 is in the lock released state and there is no load on the seat back 14 then the seat back 14 tilts forward to a predetermined position relative to the seat cushion 12. However, when each of the reclining mechanisms 20 is in the lock released state and a load of a predetermined value or above acts toward the rear on the seat back 14, the seat back 14 tilts to the rear relative to the seat cushion 12. Also, when the operation force of the lock release arm 20F is released when the seat back 14 is at a desired angle of inclination relative to the seat cushion 12, the reclining mechanisms 20 return to the locked state due to the biasing force of the torsion spring 20E, and the seat back 14 is maintained at the desired angle of inclination relative to the seat cushion 12.

The lock release of the reclining mechanisms 20 is achieved by operation force, from an operation lever 30 taking up a recliner selected state, being transmitted by a covered cable 35 (these will be described later) to the lock release arm 20F.

Figure 6:
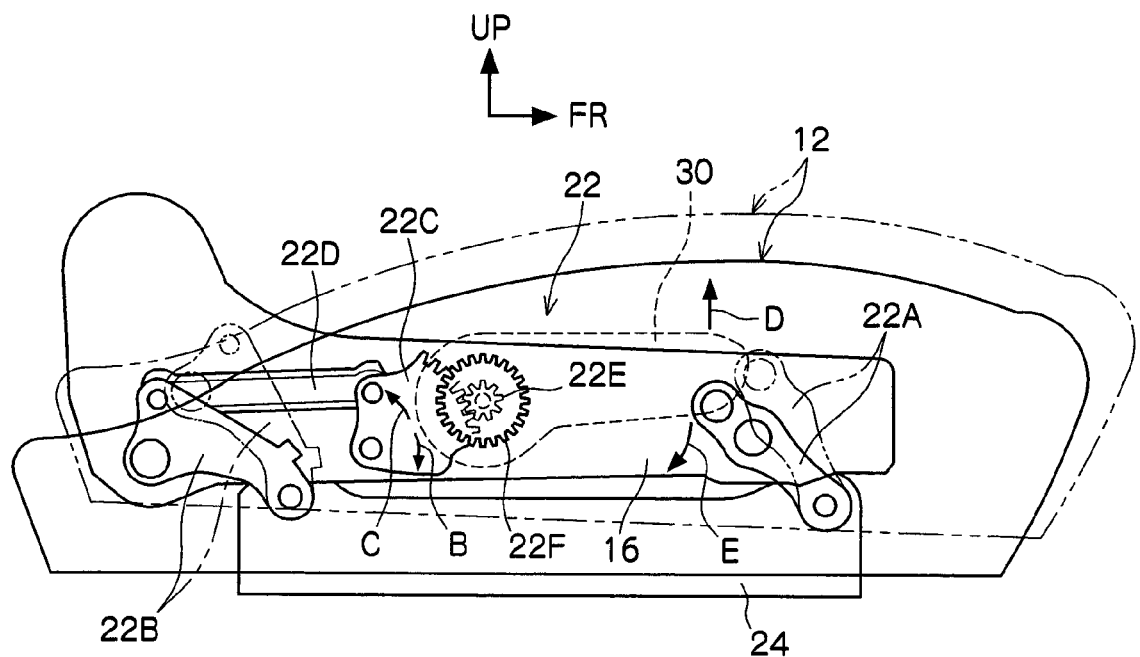
FIG. 6 is side view showing a seat lifter configuring a vehicle seat according to the first exemplary embodiment of the present invention.

The vehicle seat 10 is also provided with a seat lifter 22 like the one shown in FIG. 6, serving as a height adjusting mechanism. The seat lifter 22 is provided with a pair of front-rear links 22A, 22B that each have top and bottom ends thereof rotatably connected to an upper rail 24 and to the seat cushion frame 16, and the front-rear links 22A, 22B together with the upper rail 24 and the seat cushion frame 16 configure a quadric crank chain. The upper rail 24 is supported so as to be able to slide in the front-rear direction on lower rails 26 (see FIG. 5), which are fixed to the vehicle body floor.

The front-rear links 22A, 22B are disposed such that phantom lines connecting top and bottom connecting portions (rotational shafts) of each are substantially parallel to each other and are inclined down toward the rear, and it is configured such that, by changing the rearward angle of inclination, the seat cushion frame 16 may be moved in the up-down direction relative to the upper rail 24 moved toward or away from the upper rail 24. It should be noted that in FIG. 6 the solid lines and the phantom lines show respectively the lower limit position and the upper limit position of the seat cushion frame 16 (seat cushion 12) relative to the upper rail 24.

There is also a lifter gear 22C provided to the seat lifter 22 and rotatably axially supported on the seat cushion frame 16, and a front end portion of a connecting link 22D is connected rotatably to the upper portion of a rotational shaft of the lifter gear 22C. The rear end portion of the connecting link 22D is connected rotatably to the upper part of the connecting portion of the link 22B with the seat cushion frame 16. Thereby, in the seat lifter 22, when the lifter gear 22C is rotated in the direction of arrow B, the link 22B rotates to the standing up direction side and the seat cushion frame 16 displaces upward, and when the lifter gear 22C is rotated in the opposite direction to that of arrow B, in the direction of arrow C, then the link 22B rotates to incline toward the rear and the seat cushion frame 16 displaces downward.

The seat lifter 22 is provided with a pinion 22E that is meshed with the lifter gear 22C, and the pinion 22E is connectable to an operation lever 30, through a pump lifter mechanism 22F and lifter load transmission member 34 described later. The pump lifter mechanism 22F is supported on the seat cushion frame 16, and the lifter gear 22C is rotated in the direction of arrow B, through the pinion 22E, by the rotation of the operation lever 30 in the direction of arrow D, and it is configured such that when the operation lever 30 is being returned from a rotational position on the arrow D side (referred to below as the upper side operation position) to a neutral position that is a non-operation position, operation force is not transmitted to the pinion 22E.

In the same manner, the pump lifter mechanism 22F rotates the lifter gear 22C in the direction of arrow C, through the pinion 22E, by the rotation in the direction of arrow E of the operation lever 30 taking up a lifter selected state, and it is configured such that when the operation lever 30 is being returned from a rotational position at the arrow E side (referred to below as the lower operation position) to a neutral position, operation force is not transmitted to the pinion 22E.

The pump lifter mechanism 22F also has a braking function such that the pinion 22E does not rotate in the reverse direction due to force from the lifter gear 22C side. It should be noted that there is a biasing member included in the pump lifter mechanism 22F that biases the operation lever 30 to toward the neutral position side, and there is no requirement for operation force to return the operation lever 30 to the neutral position.

By the above, the seat lifter 22 raises the seat cushion 12 relative to the vehicle body floor with a reciprocating swinging movement by rotation of the operation lever 30 between the neutral position and the rotational position on the arrow D side, and the seat lifter 22 lowers the seat cushion 12 relative to the vehicle body floor with a reciprocating swinging movement by rotation of the operation lever 30 between the neutral position and the rotational position on the direction of arrow E side. Also, the seat cushion 12 may be maintained at a desired height against a seating load.

As shown in FIG. 5, at a edge portion of the seat cushion 12 in the seat width direction (at the vehicle width direction outside, for example) there is disposed an operation force imparting unit 28, for adjusting the reclining angle of the vehicle seat 10 and the height relative to the floor thereof. The operation force imparting unit 28 is provided with the operation lever 30 as a single operation member for operating independently the reclining mechanism 20 and the seat lifter 22.

Figure 3:
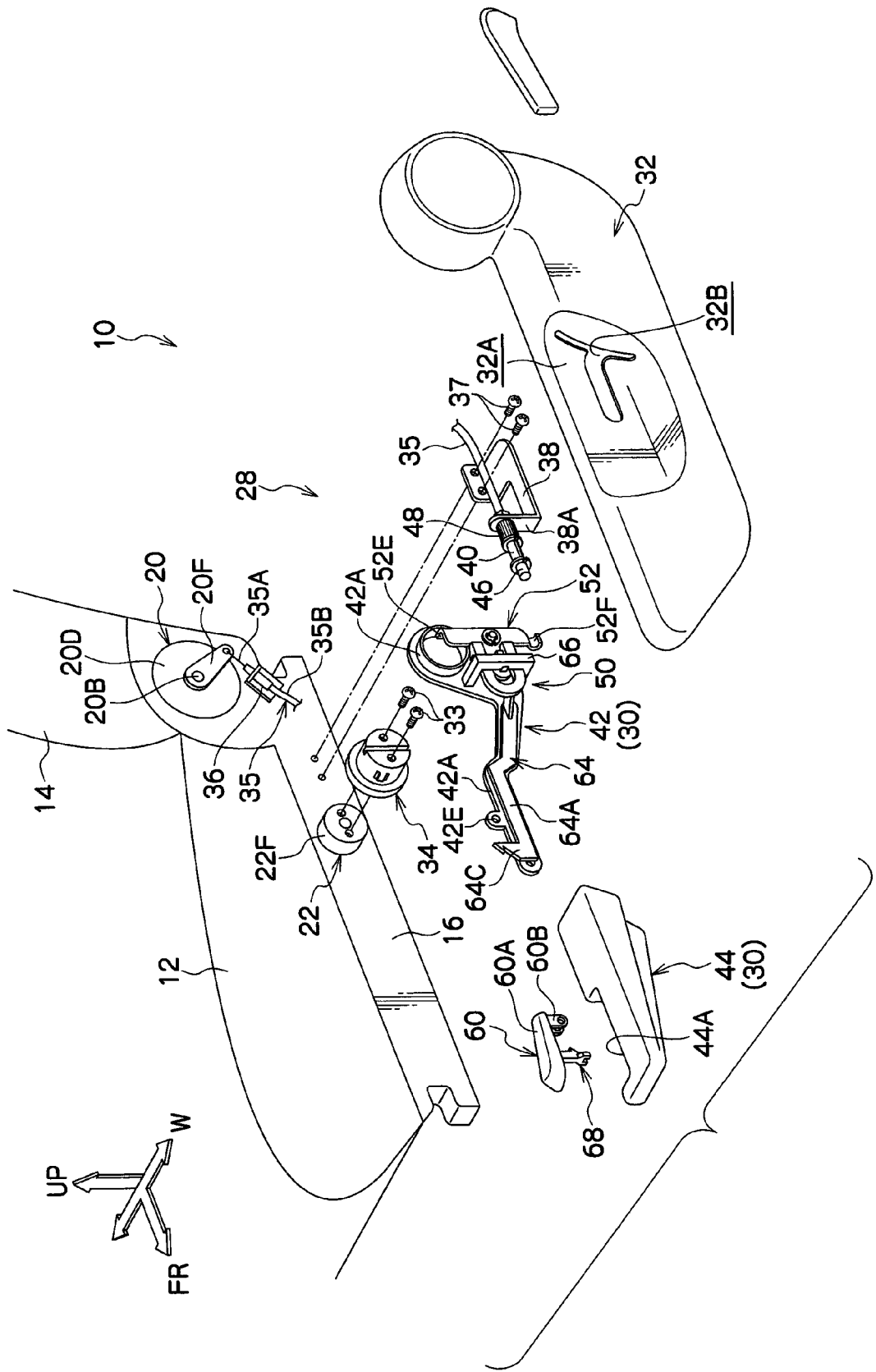
FIG. 3 is an exploded perspective view of relevant portions of a vehicle seat according to the first exemplary embodiment of the present invention.
Figure 4:
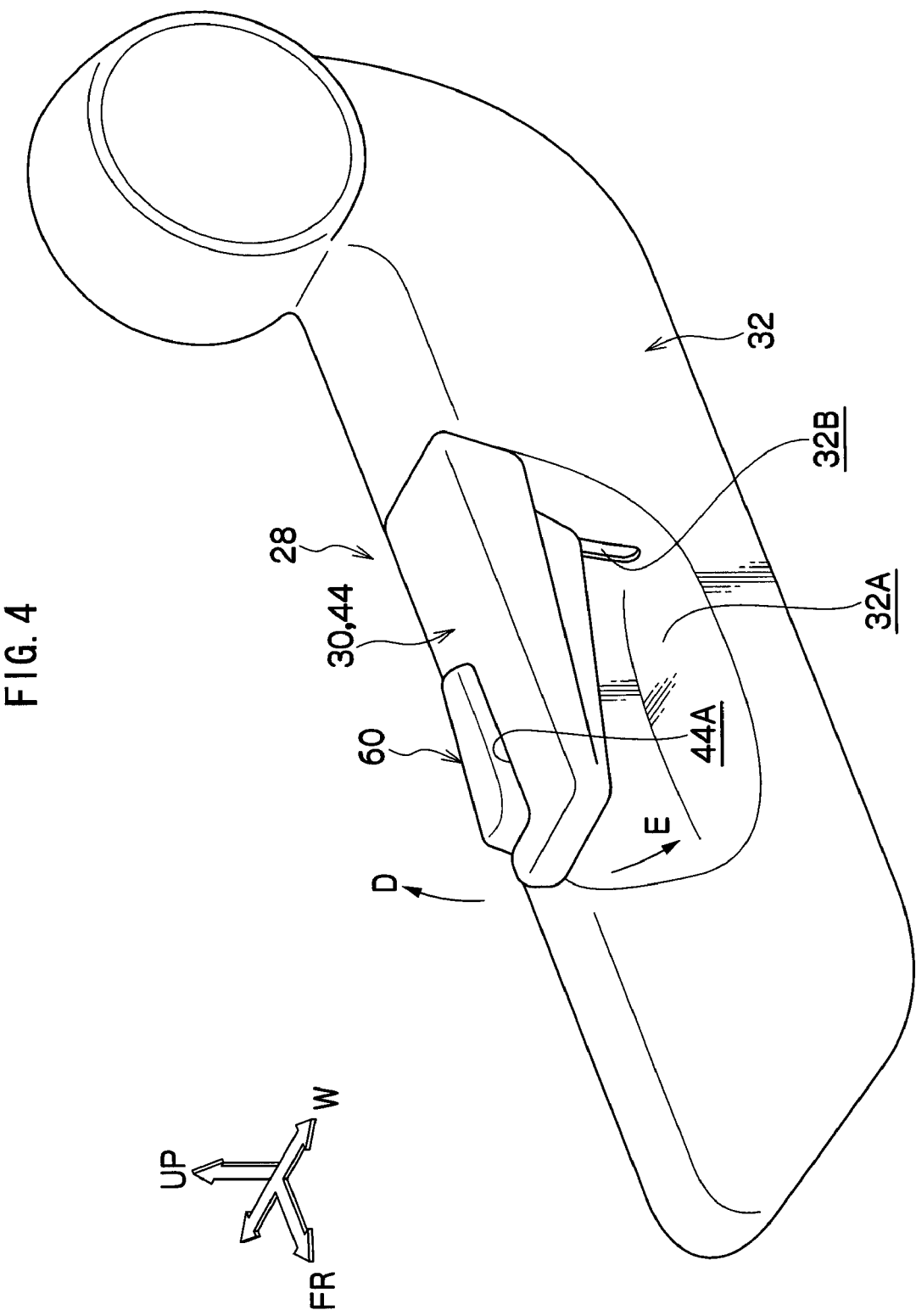
FIG. 4 is a perspective view of the outer appearance of an operation force imparting unit of a vehicle seat according to the first exemplary embodiment of the present invention.

The operation force imparting unit 28 is disposed to an operable side portion of the seat cushion 12. Specifically, as shown in FIG. 3, at the side portion of the seat cushion 12 there is an outer shield 32 that is mounted to the seat cushion frame 16 and that covers the reclining mechanism 20 and the seat lifter 22 from the width direction outside. A mechanics of the operation force imparting unit 28 is also covered from the width direction outside by the outer shield 32, and, as shown in FIG. 4, the operation lever 30 (handle portion 44, described later), which is disposed in an operation recess 32A provided recessed into an intermediate portion in the front-rear direction of the outer shield 32, is positioned outside of the outer shield 32 so as to be able to be operated by a seat occupant.

Explanation will now be given of details of the mechanism for independently operating the reclining mechanism 20 and the seat lifter 22 by the operation force imparting unit 28.

Figure 1:
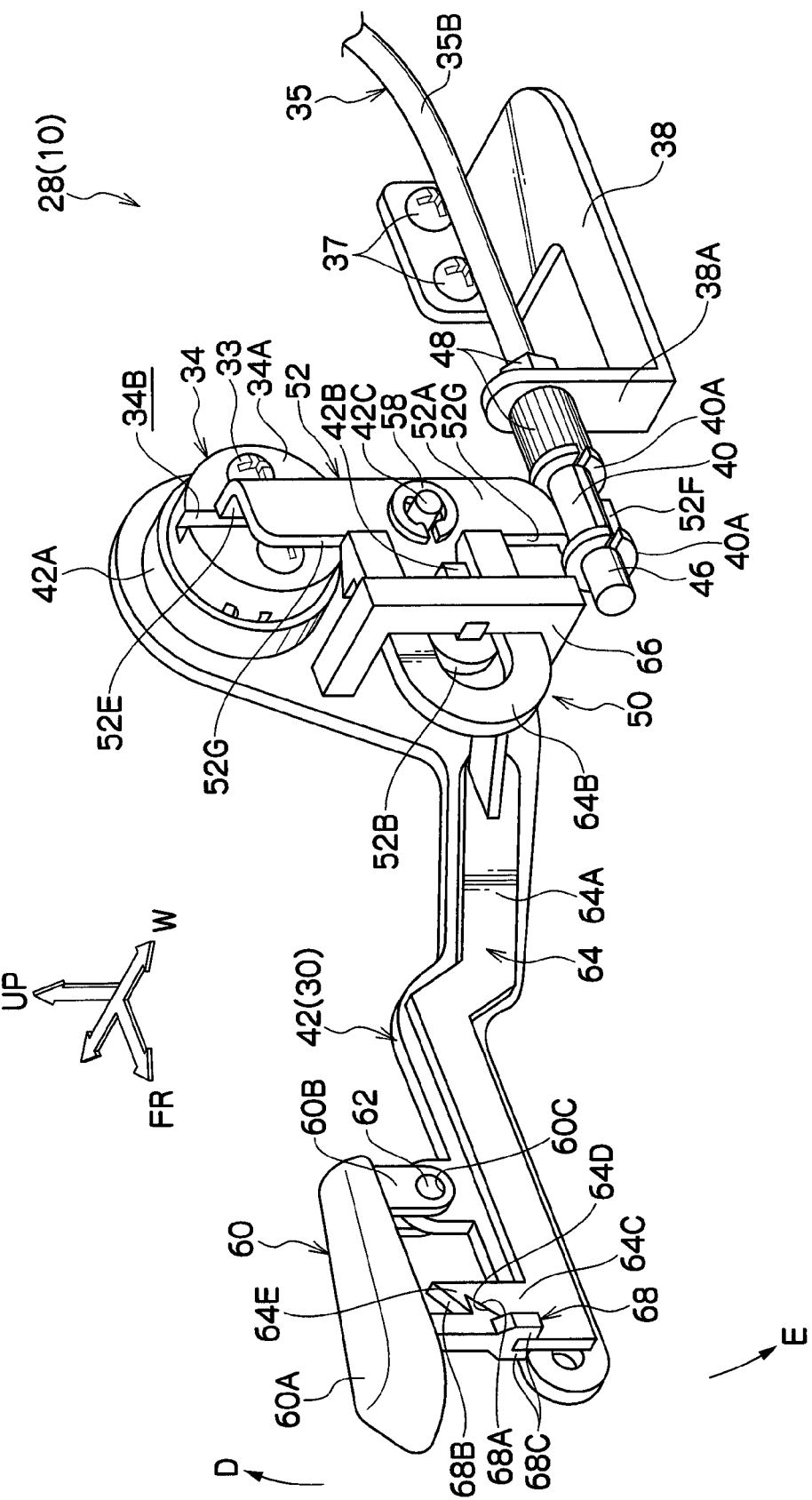
FIG. 1 is a perspective view of the internal structure of an operation force imparting unit of a vehicle seat according to a first exemplary embodiment of the present invention.
Figure 2:
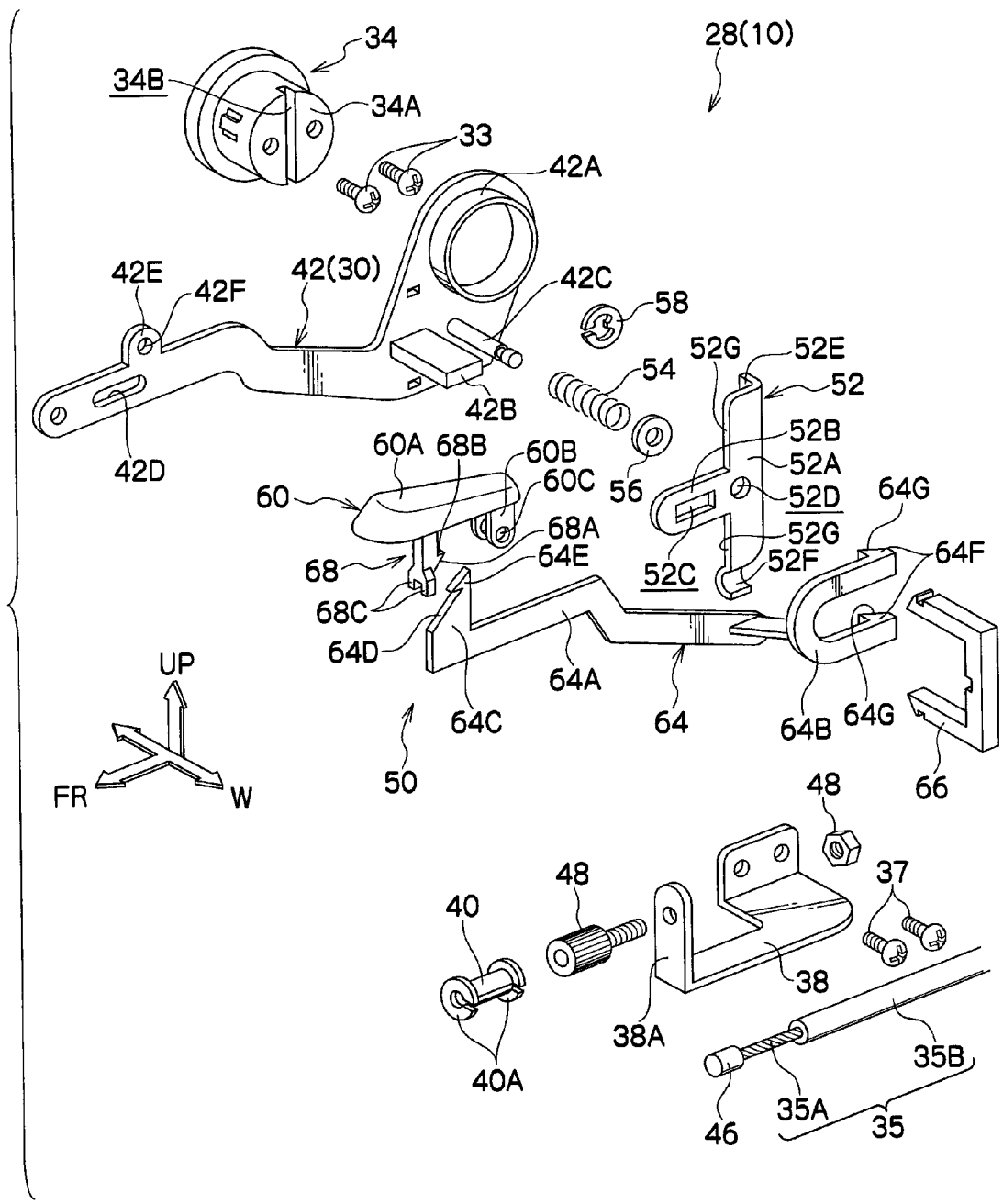
FIG. 2 is an exploded perspective view of an operation force imparting unit of a vehicle seat according to the first exemplary embodiment of the present invention.

As shown in FIG. 1 to FIG. 3, the operation force imparting unit 28 is provided with the lifter load transmission member 34 for transmitting load to the pump lifter mechanism 22F of the seat lifter seat lifter 22. The lifter load transmission member 34 is formed with a bottomed cylindrical shape that is open to the inside in the width direction, and is fixed by screws 33 coaxial to the pump lifter mechanism 22F, in a state in which it covers the pump lifter mechanism 22F the lifter load transmission member 34, so as to rotate as one therewith. A bottom plate portion 34A is positioned at the outside end in the width direction in the lifter load transmission member 34, and there is a slit 34B formed along a radial direction of the lifter load transmission member 34. The slit 34B is open to the outside in the width direction and is also open in the radial direction of the bottom plate portion 34A. The lifter load transmission member 34 is mounted to the pump lifter mechanism 22F such that the length direction of the slit 34B is in the up-down direction when the seat lifter 22 is in the non-operation state.

As shown in FIG. 3, one end of a cable 35A, with a cover portion 35B covering the cable 35A and configuring the covered cable 35, is anchored to the lock release arm 20F of the reclining mechanism 20. One end of the cover portion 35B is fixed and supported at a cable fixing bracket 36 that is fixed to the seat cushion frame 16 in the vicinity of the reclining mechanism 20, and the other end of the cover portion 35B is fixed and supported by a fixing 48 at a cable fixing bracket 38 that is fixed to the seat cushion frame 16 with screws 37 in the vicinity of the operation lever 30.

As shown in FIG. 1, a covering support portion 38A of the cable fixing bracket 38 is formed in a plate shape that faces the front-rear direction, and that is passed through by and supports the cover portion 35B, so that the other end of the cable 35A is able to be pulled out toward the front. The other end of the cable 35A is inserted through a protection sleeve 40 formed in a substantially circular cylindrical shape at the front and rear with flanges 40A, and the distal end of the cable 35A is prevented from coming out of the protection sleeve 40 by a pull-out prevention member 46 fixed thereto. The covered cable 35 is suitably curved at an intermediate portion thereof, not illustrated, and when the protection sleeve 40 is displaced to the front, the cable 35A is pulled out from the cover portion 35B and rotates the lock release arm 20F in the direction of arrow A.

Therefore, the operation force imparting unit 28 is configured with switchable states of: a state in which the operation force of the operation lever 30 by a seat occupant is transmitted as rotational force in either the arrow D or arrow E direction to the lifter load transmission member 34, or a state in which the force of the operation lever 30 is transmitted as movement force of the protection sleeve 40, toward the front.

As shown in FIG. 3, the operation lever 30 is configured with a lever body 42, and a handle portion 44 that covers a portion of the lever body 42 and has an operation portion for operation by a seat occupant and a decorative portion. As shown in FIG. 1 and FIG. 2, the lever body 42 is long in the front-rear direction, and there is a supported portion 42A provided in a circular cylinder shape to the rear end portion thereof, the supported portion 42A fitting over the lifter load transmission member 34 so as to be able to slide in the circumferential direction, thereby being supported coaxially and independently rotatable with respect to the pump lifter mechanism 22F (lifter load transmission member 34). In this state, the slit 34B of the lifter load transmission member 34 is positioned with the full depth thereof to the outside of the supported portion 42A in the width direction.

At a portion in the vicinity of the front bottom of the supported portion 42A of the lever body 42 there is a guide lug 42B and a guide rod 42C, protruding out mutually parallel to each other. The guide lug 42B is formed in a shape so as to prevent rotation (in this embodiment it is formed into a rectangular shape in cross-section), and the guide rod 42C is formed as a circular column shape. Also, as shown in FIG. 2, there is a guide hole 42D formed long in the front-rear direction in the vicinity of the front end of the lever body 42, and a switch supporting lug 42E is provided projecting upward from the vicinity of the rear end of the guide hole 42D. There is a shaft hole 42F formed to the switch supporting lug 42E.

In the lever body 42 that has been explained above, the portion thereof that is further to the front than the guide lug 42B passes through a guide slit 32B that has been formed in a rear portion of the operation recess 32A of the outer shield 32, and is thereby disposed to the outside of the outer shield 32. The portion of the lever body 42 that is positioned to the outside of the outer shield 32 is covered by the handle portion 44. In the operation lever 30, when the handle portion 44 is operated in substantially the up direction, the lever body 42 rotates about the axial center of the supported portion 42A (of the pump lifter mechanism 22F) in the direction of arrow D, and when the handle portion 44 is operated in substantially the down direction, the lever body 42 rotates about the axial center of the supported portion 42A in the direction of arrow E.

In the lever body 42 there is also incorporated a switching mechanism 50, as a switching device for switching between: a state in which the operation force accompanying the rotational operation of the operation lever 30 in either the arrow D or arrow E direction is transmitted as rotational operation force to the lifter load transmission member 34; and a state in which the force accompanying the rotational operation of the operation lever 30 in the direction of arrow D is transmitted as movement force of the protection sleeve 40 toward the front.

As shown in FIG. 1 and FIG. 2, the switching mechanism 50 is provided with a switching engaging member 52, serving as a force transmission portion. The switching engaging member 52 is formed as substantially a reclining T-shape and is provided with a body 52A that is long in the up-down direction, and a guided tab 52B that extends toward the front from an intermediate portion in the up-down direction of the body 52A. There is a guide hole 52C, which corresponds to the guide lug 42B and which is formed to the guided tab 52B, and there is also a through hole 52D, which corresponds to the guide rod 42C and which is formed to an intermediate portion in the up-down direction of the body 52A that is long in the up-down direction. The switching engaging member 52 is supported, by the guide lug 42B and the guide rod 42C passing through the guide hole 52C and the through hole 52D, to the outside in the width direction of the lever body 42 so as to be able to relatively displace to the width direction.

There is a slit engaging tab 52E that is formed from the rear edge of the body 52A of the switching engaging member 52, extending toward the inside in the width direction over substantially all of the length in the up-down direction. The slit engaging tab 52E is able to progress into or retreat with respect to the slit 34B of the lifter load transmission member 34 by relative displacement in the width direction of the switching engaging member 52 relative to the lever body 42. Namely, the slit engaging tab 52E is able to take up: a lifter engaged position, in which the slit engaging tab 52E is intruded into slit 34B and the operation force in the direction of arrow D or the direction of arrow E of the lever body 42 can be transmitted to the lifter load transmission member 34; and a lifter disconnected position in which the slit engaging tab 52E is removed to the outside in the width direction from the slit 34B and the operation force, in the direction of arrow D or the direction of arrow E of the lever body 42, is disconnecting from the lifter load transmission member 34.

Furthermore, in the switching engaging member 52, provided extending from the bottom end of the body 52A that is long in the up-down direction, there is a cable engaging portion 52F formed in a semi-circular arc shape which is open to the outside in the width direction, when viewed from the front. The cable engaging portion 52F is able to proceed or retreat from between the flanges 40A of the protection sleeve 40. Namely, the cable engaging portion 52F is able to take up: a recliner engaged position, in which the cable engaging portion 52F is intruded between the flanges 40A and operation force of the lever body 42 in the direction of arrow D can be transmitted to the protection sleeve 40; and a recliner disconnecting position, in which the cable engaging portion 52F is removed to the outside in the width direction from between the flanges 40A and operation force of the lever body 42, in the direction of arrow D, is disconnecting from the protection sleeve 40.

In the switching engaging member 52, the dimensions, shape and positioning of each of the components are determined such that when the slit engaging tab 52E takes up the lifter engaged position the cable engaging portion 52F takes up the recliner disconnecting position (this state is called the lifter selected state), and when the cable engaging portion 52F takes up the recliner engaged position the slit engaging tab 52E takes up the lifter disconnecting position (this state is called the recliner selected state).

Furthermore, as shown in FIG. 2, there is a compression coil spring 54 provided, disposed in a compressed state between the lever body 42 and the switching engaging member 52, with the guide rod 42C inserted through the compression coil spring 54. More specifically, there is a ring-shaped washer 56 disposed between the compression coil spring 54 and the switching engaging member 52, and an E-ring 58 is mounted to the guide rod 42C that has passed through the body 52A (through hole 52D) such that the guide rod 42C cannot come out in the seat width direction. In this manner, the switching engaging member 52 is biased to the outside in the vehicle width direction by the biasing force of the compression coil spring 54, and normally (in the switching switch non-operation state, described later) takes up the recliner selected state.

As shown in FIG. 1, the switching mechanism 50 is provided with a switching switch 60, serving as a switch operating member. The switching switch 60 is disposed to a front portion of the operation lever 30, so as to be easily operated by the thumb of a hand that has gripped the handle portion 44. Specifically, the switching switch 60 has a pair of support tabs 60B that hang down from a rear portion of a switch body 60A and oppose each other along the width direction, and this pair of support tabs 60B have shaft holes 60C formed therein, corresponding to the shaft hole 42F of the lever body 42. In the state in which the switch supporting lug 42E is sandwiched between the pair of support tabs 60B, a support pin 62 passes through each of the shaft holes 60C and the shaft hole 42F, thereby supporting the switching switch 60 so that it is able to rotate about the support pin 62 relative to the lever body 42.

The operation force of the switching switch 60 is transmitted to the switching engaging member 52 through a interlocking slider (link) 64, serving as an interlocking portion. The interlocking slider 64 is formed from plate-shaped member with a shape that is similar, in side view, to the front portion of the lever body 42, and there is a guide pin, not illustrated, that projects out toward the inside in the width direction from the vicinity of the front end of a slide body 64A and that intrudes into the guide hole 42D of the lever body 42. Thereby, the slide body 64A is restricted in displacement to the inside in the width direction by the lever body 42, and is also restricted in up-down direction displacement by the guide pin intruding into the guide hole 42D.

There is a rear guide portion 64B provided to a rear portion of the slide body 64A, the rear guide portion 64B being formed, when viewed from the side, into a substantially U-shape that is open toward the rear, and that is offset to the outside in the width direction. The rear guide portion 64B is disposed so as to straddle above and below the guided tab 52B. The rear guide portion 64B is restricted from displacing in the up-down direction and to the outside in the width direction by a guide body 66 that is formed, when viewed from the front, in a substantially U-shape that is open to the inside in the width direction and that has been fixed by the ends of the opening to the lever body 42. By the above described configuration the interlocking slider 64 is only permitted to slide in the front-rear direction relative to the lever body 42.

There is a plate-shaped inverted cam 64C formed protruding upward from the front end of the slide body 64A. The inverted cam 64C has a cam surface 64D with an face that is inclined toward the front and toward the top, and there is a stopper 64E formed integrally to the top end of the cam surface 64D in the shape of a hook. The interlocking slider 64 is configured to slide to the rear due to downward pressure from a driven cam 68, provided to the switching switch 60, onto the cam surface 64D of the inverted cam 64C.

Specifically, the driven cam 68 is provided with: an inclined cam surface 68A that, within the sliding range of the interlocking slider 64, is constantly in surface contact with the cam surface 64D and able to slide thereon; a stopper 68B, that engages with the hook-shaped stopper 64E at the limit of movement to the front of the interlocking slider 64; and a fall-out prevention protraction 68C, which is positioned so as to sandwich the inverted cam 64C from both sides in the width direction. In the driven cam 68, when the front portion of the switching switch 60 is displaced downward so as to rotate about the support pin 62, the cam surface 68A slides on the cam surface 64D and presses the cam surface 64D, thereby sliding the interlocking slider 64 toward the rear.

There are also driven cam portions 64F formed to each of the top and bottom rear ends of the rear guide portion 64B, and each of the driven cam portions 64F has a cam surface 64G that faces both to the rear and to the inside in the width direction. Within the sliding range of the interlocking slider 64, each of the cam surfaces 64G constantly contacts front edges 52G of the body 52A, straddling the two sides of the guided tab 52B of the switching engaging member 52, so as to be able to slide thereon. Thereby, when the switching switch 60 is pressed and the interlocking slider 64 slides to the rear, the switching engaging member 52 is guided by the guide lug 42B and moves to the inside in the width direction against the biasing force of the compression coil spring 54. The dimensions, shape and disposition of each of the components in the present exemplary embodiment are determined such that when the switching switch 60 is operated by pushing down to the operation limit, the switching state is switched to that of the lifter selected state.

The switching mechanism 50 is configured such that when the operation force of the switching switch 60 is released, the switching engaging member 52 returns to the recliner selected state by the biasing force of the compression coil spring 54, the interlocking slider 64 returns to the front side movement limit, and the switching switch 60 engages the stopper 68B with the stopper 64E, returning to the non-operation position.

As shown in FIG. 4, the switching switch 60, explained above, of the switching mechanism 50, is disposed projecting out from the top side of a cut out portion 44A that has been formed in a portion to the inside in the width direction at a front portion of the handle portion 44, so as to be operable by pressing by a seat occupant (by the thumb thereof).

It should be noted that the operation lever 30 (lever body 42), incorporating the switching mechanism 50 that is normally maintained in the recliner selected state, is configured so as to maintain, by the biasing force of the torsion spring 20E, a non-operation position, this being a neutral position in which at the other end of the cable 35A from the end of the cover portion 35B (at the end on the operation force imparting unit 28 side) there is a minimum pull-out state (the protection sleeve 40 impinges on the cable fixing bracket 38).

Explanation will now be given of the operation of the first exemplary embodiment.

In the vehicle seat 10 configured as described above, when a seat occupant is adjusting the height of the vehicle seat 10 in the direction to increase the seating height of a seat occupant, the seat occupant, for example, grips the handle portion 44 of the operation lever 30 and, while pressing the switching switch 60 to the handle portion 44 inside with their thumb or the like, that is to say while switching the switching mechanism 50 to the lifter selected state, the seat occupant also swings (reciprocating rotation) the operation lever 30 from the neutral position to the upper operation position. Within the operations of the operation lever 30, the operation force that accompanies movement toward the upper operation position from the neutral position, is transmitted, through the switching engaging member 52, the lifter load transmission member 34 with the slit 34B that is intruded into by the slit engaging tab 52E of the switching engaging member 52, to the pump lifter mechanism 22F, namely to the seat lifter 22, and the seat cushion 12, namely the vehicle seat 10, is displaced overall upward. When operation of the operation lever 30 is stopped at the desired height, the height of the seat cushion 12 is maintained at the adjusted height by the seat lifter 22.

In a similar manner, when a seat occupant is adjusting the direction to decrease the seating height of a seat occupant, the seat occupant, for example, grips the handle portion 44 of the operation lever 30 and, while pressing the switching switch 60 to the handle portion 44 inside with their thumb or the like, that is to say while switching the switching mechanism 50 to the lifter selected state, the seat occupant also swings (reciprocating rotation) the operation lever 30 from the neutral position to the lower operation position. Within the operations of the operation lever 30, the operation force that accompanies movement toward the lower operation position from the neutral position is transmitted, through the switching engaging member 52, the lifter load transmission member 34 with the slit 34B that is intruded into by the slit engaging tab 52E of the switching engaging member 52, to the pump lifter mechanism 22F, and the seat cushion 12, namely the vehicle seat 10, is displaced overall downward. When operation of the operation lever 30 is stopped at the desired height, the height of the seat cushion 12 is maintained at the adjusted height by the seat lifter 22.

On the other hand, when a seat occupant is adjusting the angle of the seat back 14 with respect to the seat cushion 12, the seat occupant does not operate the switching switch 60, that is to say with the state remains that of the recliner selected state, but puts their fingers around the handle portion 44 of the operation lever 30, or grips the handle portion 44, and pulls the front portion of the handle portion 44 upward. By doing so, accompanying the rotation of the operation lever 30 in the direction of arrow D, the cable engaging portion 52F displaces substantially in the forward direction, and the cable 35A is pulled out from the cover portion 35B. Thereby, the cable 35A, which is relatively displacing with respect to the cover portion 35B, rotates the lock release arm 20F in the direction of arrow A, and the lock of the reclining mechanism 20 is released.

The seat occupant places their body weight against the seat back 14, tilts the seat back 14 backward, and stops at the desired position, or stops the seat back 14, which is swinging up with the biasing force of the return spring, at the desired position. When the seat occupant releases the operation force from the reclining lever 30, the reclining mechanism 20 returns to the locked state, by the biasing force of the torsion spring 20E, and the reclining lever 30 returns to the non-operation position.

In the vehicle seat 10, since both the reclining mechanism 20 and the seat lifter 22 can be adjusted by independent (selectively) operation of the single operation lever 30, the operation lever 30 is disposed in a position with good operability for a seat occupant and by doing so the operability of both the reclining mechanism 20 and the seat lifter 22 may be realized.

Figure 18:
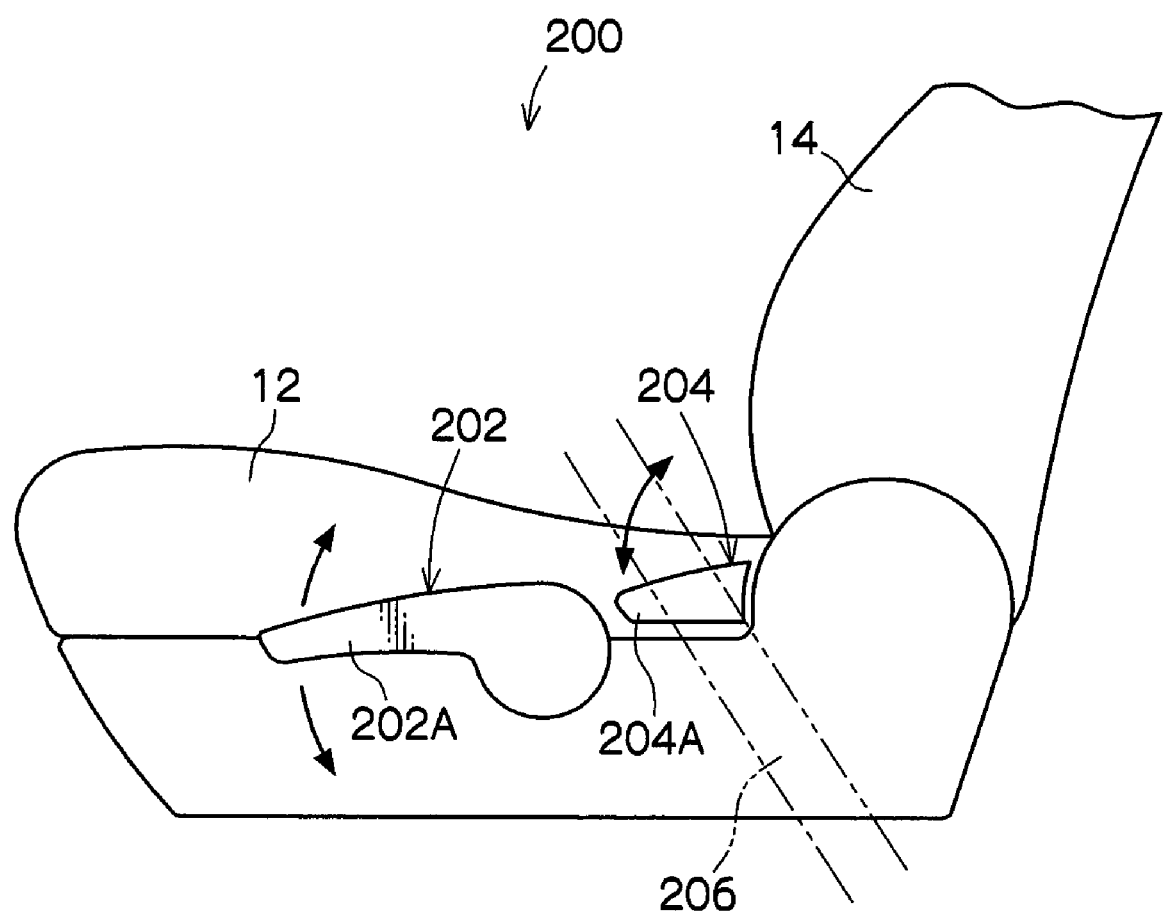
FIG. 18 is a side view showing a seat according to a comparative example to that of a vehicle seat according to an exemplary embodiment of the present invention.

Regarding this point, comparing such a configuration with that of a comparative example of FIG. 18, in a vehicle seat 200 according to the comparative example operating portions 202A, 204A, for a seat occupant to independently operate a lifter knob 202 for use in adjusting the height of the seat and operating a reclining lever 204 for use in releasing the reclining lock, are disposed a large distance apart. Due to this, the necessary minimum dimensions and space for independent operation must be secured for each of the lifter knob 202 and the reclining lever 204, and there are many restrictions on the dimensions, shape and arrangement thereof. Specifically, in the vehicle seat 200, only one of the operating portions 202A, 204A can be placed in a position that has good operability for a seat occupant, and in the comparative example, since the position of the reclining lever 204 is toward the rear, it is not easily reached, and there is a worry that the seatbelt device 206 (buckle anchor portion) might get in the way of a hand when operating. Furthermore, the arm length (front-rear length) of both the lifter knob 202 and the reclining lever 204 are restricted to being short, and so there is a limit to the reduction that may be made to the operation force. Also, since precedence is given to securing the functionality of each of the lifter knob 202 and the reclining lever 204 within the above described limited space, there is little degree of freedom for decoration and design in the vehicle seat 200.

In this manner, in a vehicle seat, there is a limited range that provides good operability for a seat occupant, but with the vehicle seat 10, since the operation lever 30 is made common for the reclining mechanism 20 and the seat lifter 22, the limitations to the arrangement and size of the reclining lever 30 are reduced, and an increase in the degrees of freedom for design is achieved. Specifically, the single operation lever 30 may be disposed in a suitable position that avoids interference with a seat belt device of the like and that is easily reached, with the operability of the reclining mechanism 20 and the seat lifter 22 secured and improved. Furthermore, since there is a high degree of freedom for setting the arm length in the operation lever 30, the operation force and the operation stroke may be appropriately set.

Thereby, in the vehicle seat 10 according to the exemplary embodiment of the present invention, the operability of plural adjustable units of the reclining mechanism 20 and the seat lifter 22 may be improved.

In the vehicle seat 10, since it is configured such that the adjustable unit to which the operation force of the operation lever 30 is transmitted may be switched by the switching mechanism 50, the operation direction of the operation lever 30, when either the reclining mechanism 20 is being adjusted or when the seat lifter 22 is being adjusted, is by displacement of the front end of the shaft support portion 30A in the up-down direction, rotating about the axial center of the pump lifter mechanism 22F (supported portion 42A), no awkward feeling is imparted to the operator (seat occupant), and both the reclining mechanism 20 and the seat lifter 22 may be operated by using the single operation lever 30.

Also, since in the switching mechanism 50 of the vehicle seat 10, the operation force of the switching switch 60 is converted by the interlocking slider 64 and the driven cam 68 and the like, the arrangement, sized and shape of plural operation force transmission paths may be readily designed to correspond thereto, and the operation direction and operation stroke, and the operation force may be readily set. However, in the switching engaging member 52, since there is the slit engaging tab 52E disposed mutually separated from the cable engaging portion 52F, the arrangement size and shape of plural operation force transmission paths may be readily designed to correspond thereto.

Also, in the vehicle seat 10, since it is configured such that the switching engaging member 52 is biased by the biasing force of the compression coil spring 54 to the recliner selected state, an occupant (seat occupant) may be prevented from unintentionally adjusting the seat height by, for example, contacting the operation lever 30 accompanying lowering themselves into the vehicle.

Next, explanation will be given of another exemplary embodiment of the present invention. It should be noted that components and parts which are fundamentally the same as those of the above first exemplary embodiment, or previous configurations, are allocated the same reference numerals as those of the above first exemplary embodiment, or previous configurations, and explanation thereof is sometimes omitted.

Second Exemplary Embodiment

Figure 8:
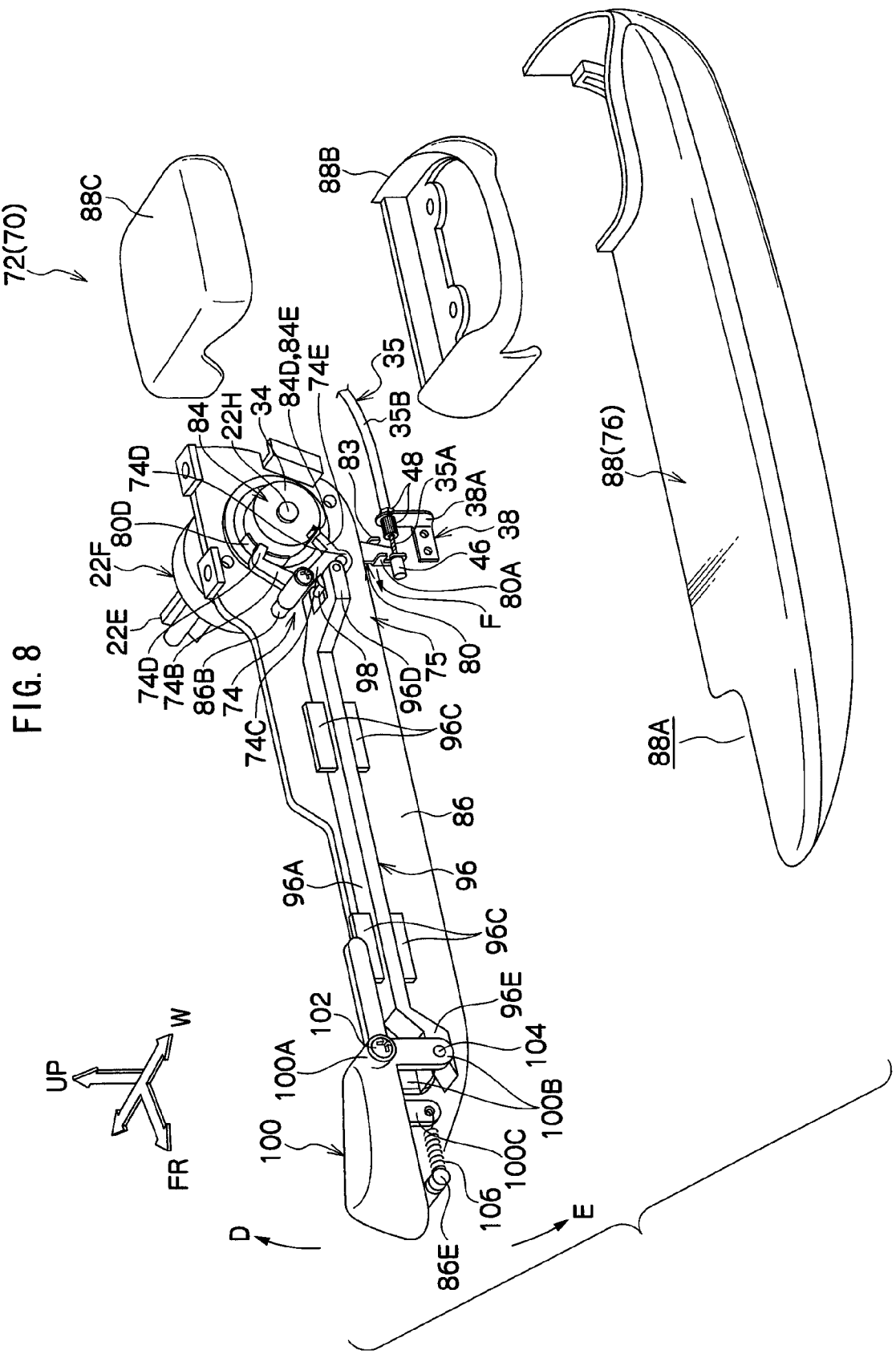
FIG. 8 is a perspective view of the internal structure of an operation force imparting unit of a vehicle seat according to a second exemplary embodiment of the present invention.

Explanation will be given of a vehicle seat 70 according to a second exemplary embodiment of the present invention, with reference to the FIGS. 8 to 12. In FIG. 8 is shown a perspective view of an operation force imparting unit 72 configuring a vehicle seat 70 according to the second exemplary embodiment. As is shown in this figure, the vehicle seat 70 is mainly different from the vehicle seat 10 in that it is provided with a switching mechanism 75 for switching between a recliner selected state and a lifter selected state by rotating a switching engagement member 74, described later, about a predetermined axis, in place of the switching mechanism 50 switching between the recliner selected state and the lifter selected state by displacing the switching engaging member 52 in the seat width direction. There are various other changes.

Figure 12:
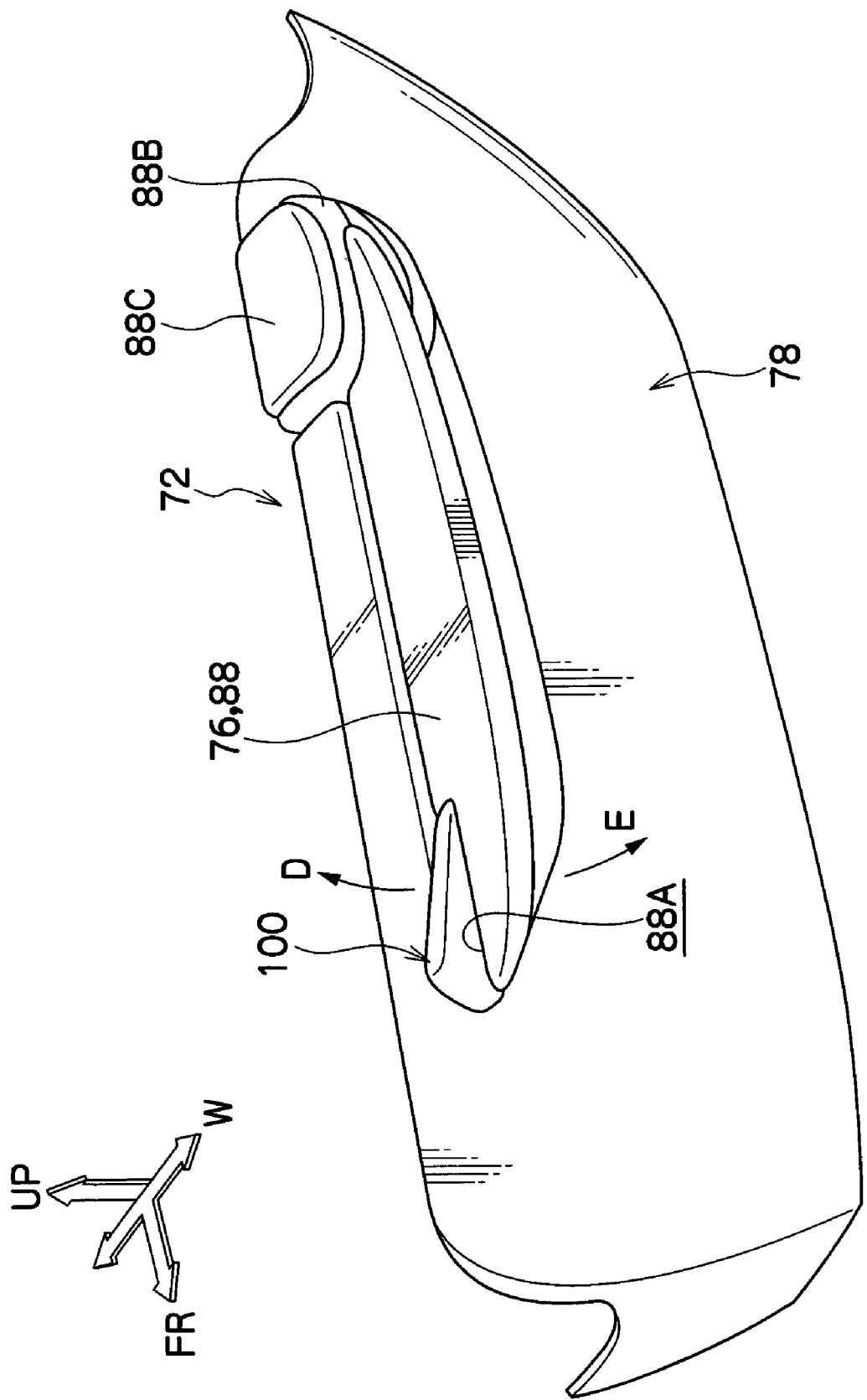
FIG. 12 is a perspective view of the outer appearance of an operation force imparting unit of a vehicle seat according to the second exemplary embodiment of the present invention.

As shown in FIG. 12, the operation force imparting unit 72 is provided with an operation lever 76 in place of the operation lever 30. The operation lever 76 is disposed overall to the outside in the width direction of an outer shield 78, except for a rear end thereof. Therefore, the outer shield 78 that is provided in place of the outer shield 32 does not have a recess equivalent to the operation recess 32A, and is formed so as to permit rotation of the rear end of the operation lever 76. Explanation will be given below of details of the operational structure of the operation lever 76 for selecting the reclining mechanism 20 and the seat lifter 22.

Figure 9:
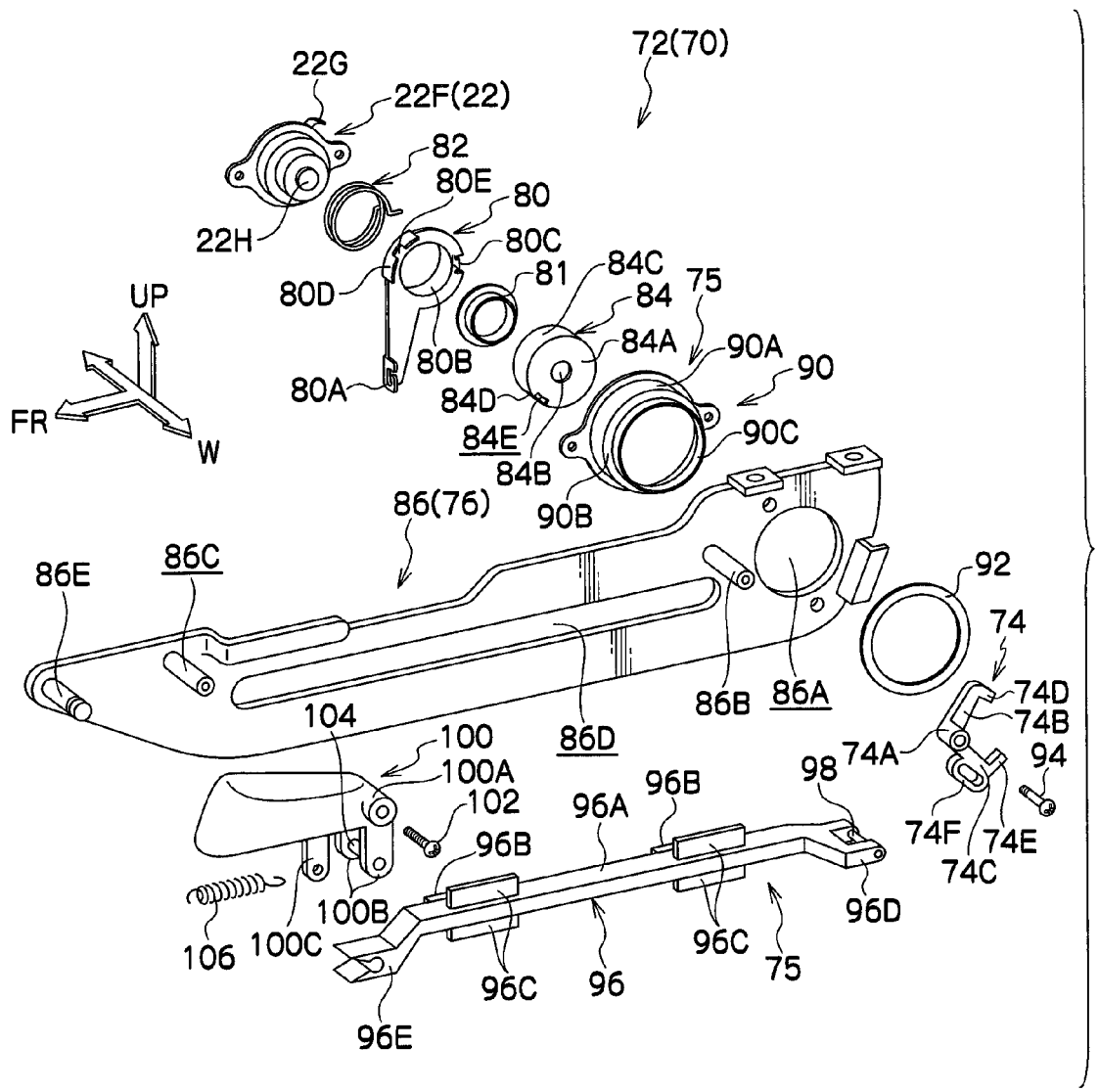
FIG. 9 an exploded perspective view of an operation force imparting unit of a vehicle seat according to the second exemplary embodiment of the present invention.

As shown in FIG. 8 and FIG. 9, the operation force imparting unit 72 is provided with a reclining load transmission arm 80. There is an engagement portion 80A formed to the lower end of the reclining load transmission arm 80, engaging to the pull-out prevention member 46 that is fixed to the end portion of the cable 35A. The engagement portion 80A has a cut out portion, formed to a plate-shaped portion thereof that faces the front and rear directions, such that the cable 35A is able to progress into and retreat therefrom, but the pull-out prevention member 46 is not able to pass therethrough.

Figure 11:
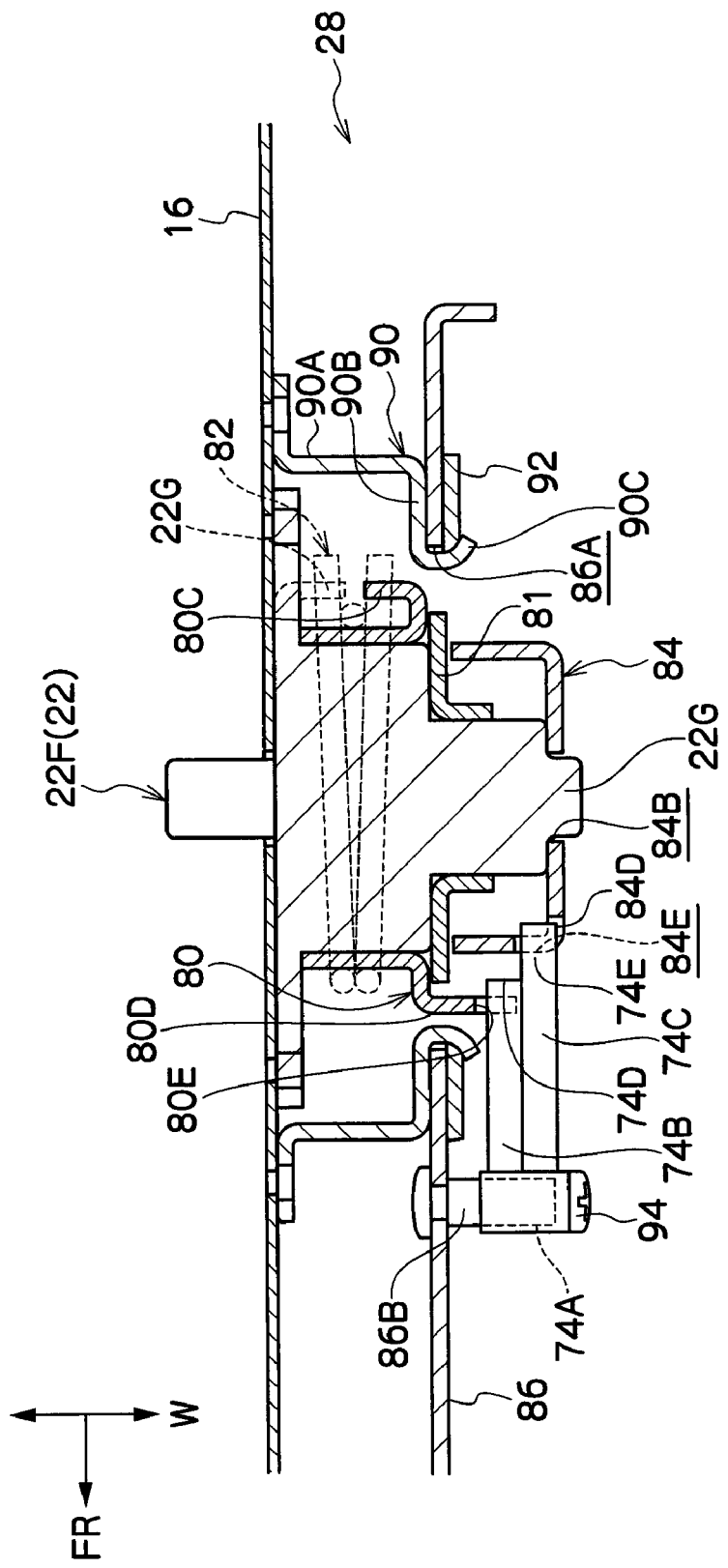
FIG. 11 is a plan view cross-section of an operation force imparting unit of a vehicle seat according to the second exemplary embodiment of the present invention.

As is shown in FIG. 9 and FIG. 11, there is a supported portion 80B formed in a circular cylindrical shape and protruding out in the width direction from the upper end of the reclining load transmission arm 80, and the supported portion 80B fits over the outer circumference of the pump lifter mechanism 22F so as to be able to slide in the circumferential direction. There is a pull-out prevention ring 81 fixed and fitted thereover, at the outside in the seat width direction relative to the supported portion 80B of the pump lifter mechanism 22F, and the reclining load transmission arm 80 is prevented from coming away from the pump lifter mechanism 22F thereby.

Thereby, the reclining load transmission arm 80 is supported coaxially to the pump lifter mechanism 22F so as to be independently rotatable, and by rotation that displaces the engagement portion 80A substantially toward the front (direction of arrow F), the pull-out prevention member 46 at the engagement portion 80A is engaged while the cable 35A is pulled out from the cover portion 35B. Furthermore, there is a torsion spring 82 disposed around the outside of the supported portion 80B, with one end of the torsion spring 82 anchored to a spring anchor lug 22G formed to the pump lifter mechanism 22F, and the other end thereof anchored to a spring anchor lug 80C formed to the supported portion 80B.

The reclining load transmission arm 80 is biased in the opposite direction to that of arrow F by the biasing force of the torsion spring 82 and, as shown in FIG. 8, is engaged with a stopper 83 that is fixed to the seat cushion frame 16. The position in which the reclining load transmission arm 80 is engaged with the stopper 83 is the non-operation position. Also, there is a switching engaging portion 80D formed to the top front side of the supported portion 80B of the reclining load transmission arm 80, formed so as to extend out toward the outside in the width direction and so as to face the front and rear directions. The switching engaging portion 80D is formed with a cut out portion 80E of substantially a reclining U-shape that is open to the outside in the width direction, and, as shown in FIG. 8, the cut out portion 80E is configured so as to be engaged by an insertion fitting portion 74D, described later, of the switching engagement member 74, intruded therein.

In the operation force imparting unit 72 there is also a lifter load transmission member 84 provided in place of the lifter load transmission member 34. The lifter load transmission member 84 is formed with a bottomed circular cylinder shape that is open to the inside in the width direction, and a fitting hole 84B is formed in the axial portion of a bottom portion 84A, and the lifter load transmission member 84 is coaxial with and rotates as one with the pump lifter mechanism 22F by an operation load input portion 22H of the pump lifter mechanism 22F being press fitted into the edge portion of the fitting hole 84B. Also, in the lifter load transmission member 84 there is a switching engagement portion 84D that is formed so as to straddle the bottom portion 84A and a peripheral wall 84C. The switching engagement portion 84D is formed, at a front bottom portion of the lifter load transmission member 84 with respect to the fitting hole 84B, as an edge portion of a cutout portion 84E that has been made in contiguous portions of the bottom portion 84A and the peripheral wall 84C. The switching engagement portion 84D is configured so as to be engaged by being intruded into by an insertion fitting portion 74E (described later) of the switching engagement member 74.

The operation lever 76 is configured including the lever body 86, and a handle portion 88 that covers the lever body 86 and has an operation portion for operation by a seat occupant and a decorative portion. As shown in FIG. 8 and FIG. 9, the lever body 86 is long in the front-rear direction, and is supported by a lever fixing bracket 90 at a support hole 86A that is formed at a rear portion thereof, so as to be able to rotate. Specifically, the lever fixing bracket 90 is formed in substantially a circular cylindrical shape, and is disposed coaxially to the pump lifter mechanism 22F, the supported portion 80B of the reclining load transmission arm 80, and the torsion spring 82, so as to cover these components from the outside in the radial direction, and the inside edge of the lever fixing bracket 90 in the width direction is fixed to the seat cushion frame 16 by non illustrated screws. Furthermore, there is a step portion 90B formed, facing the outside in the width direction, at the outside edge in the width direction of a body 90A of the lever fixing bracket 90, and there is a lever support portion 90C formed further to the outside in the width direction than the step portion 90B with a diameter that is smaller than that of the body 90A.

In the lever body 86, as shown in FIG. 11, the lever support portion 90C of the lever fixing bracket 90 passes through the support hole 86A and the lever body 86 is sandwiched between a pull-out prevention ring 92, and by the step portion 90B that has passed through the lever support portion 90C, such that the lever body 86 is able to rotate coaxially with the pump lifter mechanism 22F. The pull-out prevention ring 92 is prevented from coming out from the lever fixing bracket 90 by crimping the leading end of the lever support portion 90C. Also, as shown in FIG. 8 and FIG. 11, each of the switching engaging portion 80D (cut out portion 80E) of the reclining load transmission arm 80 and the lifter load transmission member 84 (switching engagement portion 84D, and the cutout portion 84E) are placed to the outside in the seat width direction with respect to the lever body 86.

As shown in FIG. 9, a support shaft (screw boss) 86B protrudes out toward the outside in the width direction from the front side of the support hole 86A in the lever body 86, and a support shaft (screw boss) 86C protrudes out toward the outside in the width direction from a front portion of the lever body 86. In the lever body 86, between the support shafts 86B, 86C at the front and rear, there is a guide hole 86D formed that is long in the front-rear direction. Furthermore, there is a spring anchoring protrusion 86E formed protruding from further to the front than the front side shaft.

The switching mechanism 75 of the operation force imparting unit 72, as shown in FIG. 8 and FIG. 9, is provided with the above mentioned switching engagement member 74. The switching engagement member 74 is formed substantially in a wide reclining V-shape, when viewed from the side, with arms 74B, 74C protruding from a boss portion 74A that is formed as a bottomed circular cylindrical shape. The boss portion 74A is axially supported (fitted into) by the support shaft 86B of the lever body 86 so as to be rotatable, and is prevented from coming off from the support shaft 86B by a screw 94 that is screwed into the support shaft 86B.

The insertion fitting portion 74D is formed to the leading end of the arm 74B so as to be able to progress into or retreat relative to the cut out portion 80E of the reclining load transmission arm 80 by rotation of the switching engagement member 74 about the support shaft 86B, and the insertion fitting portion 74E is formed to the leading end of the arm 74C so as to be able to progress into or retreat relative to the cut out portion 84E of the lifter load transmission member 84 by rotation of the switching engagement member 74 about the support shaft 86B. In the switching mechanism 75, the dimensions, shape and disposition of each of the components are determined such that in the state in which the insertion fitting portion 74D is intruding into the cut out portion 80E (fitted into) the insertion fitting portion 74E is pulled out from the cutout portion 84E (this state is called the recliner selected state), and in the state in which the insertion fitting portion 74E is intruding into the cutout portion 84E (fitted into) the insertion fitting portion 74D is pulled out from the cutout portion 80E (this state is called the lifter selected state).

Namely, it is configured such that when the operation lever 76 is operated in the direction of arrow D in the recliner selected state, the operation force transmitted therefrom is transmitted from the insertion fitting portion 74D of the switching engagement member 74, via the switching engaging portion 80D, to the reclining load transmission arm 80, and the engagement portion 80A is displaced substantially toward the front so that the lock of the reclining mechanism 20 is released. On the other hand, it is configured such that when the operation lever 76 is operated in the direction of arrow D or the direction of arrow E in the lifter selected state, this operation force is transmitted via the insertion fitting portion 74E of the switching engagement member 74, the switching engagement portion 84D of the lifter load transmission member 84, and the bottom portion 84A, to the operation load input portion 22H, resulting in seat height adjustment by the seat lifter 22.

As shown in FIG. 9, there is a coupling portion 74F, formed as a long hole along the length direction of the arm 74C of the switching engagement member 74. As shown in FIG. 8, there is a coupling pin 98, which is supported at the rear end of a interlocking slider 96, serving as an interlocking portion, inserted and passing through the coupling portion 74F. The interlocking slider 96 is long in the front-rear direction, and there are a pair of guide protrusions 96B that protrude out to the inside in the width direction from a body 96A, as shown in FIG. 9, and the guide protrusions 96B are inserted into the guide hole 86D of the lever body 86 so as to be able to slide in the front-rear direction. Also, the interlocking slider 96 is provided with guide lugs 96C that project out in each of the up and down directions from the body 96A, and the interlocking slider 96 is restricted from displacing to the inside in the width direction relative to the lever body 86 by the guide lugs 96C.

There is a pin support portion 96D provided to the rear end of the interlocking slider 96 and shaped, in plan view, as a reclining U-shape that is open to the rear, and the coupling pin 98 that spans across the open end at the rear side of the pin support portion 96D is inserted through the coupling portion 74F of the switching engagement member 74 so as to be able to slide relative to the coupling portion 74F in the length direction thereof. In this manner, it is configured such that when the interlocking slider 96 is moved to the front side movement limit relative to the lever body 86 then the switching mechanism 75 enters the recliner selected state, and when the interlocking slider 96 moves to the rear side movement limit relative to the lever body 86 then the switching mechanism 75 enters the lifter selected state. The front and rear movement limits of the interlocking slider 96 are set at the engagement positions of the front and rear ends of the guide hole 86D with the guide protrusions 96B.

There is also a pin engaging portion 96E provided to the front end of the interlocking slider 96. The pin engaging portion 96E has the link pin 104 of the switching switch 100 inserted therein, so as to prevent the link pin 104 from falling out but to allow a small amount of change of position thereof. In this exemplary embodiment the pin engaging portion 96E is formed in a clip shape that is open to the front, and the link pin 104 is inserted into the pin engaging portion 96E while elastically deforming the pin engaging portion 96E.

The switching mechanism 75 is provided with a switching switch 100, serving as a switching portion. The switching switch 100 is formed, like the switching switch 60, into a shape that is easy to operate with the thumb of a hand gripping the handle portion 88. There is a boss portion 100A provided to the rear end of the switching switch 100, and the boss portion 100A is axially supported (fitted into) by the support shaft 86C of the lever body 86 so as to be able to rotate and is also prevented from coming off from the support shaft 86C by a screw 102 that is screwed into the support shaft 86C.

Furthermore, the switching switch 100 has a pair of support tabs 100B that hang down from a rear portion thereof and oppose each other along the width direction, and the link pin 104 that was mentioned above spans across between the support tabs 100B. It is configured in the switching switch 100 such that with the pair of support tabs 100B aligned substantially along the up-down direction the interlocking slider 96 is positioned to the front side movement limit (recliner selected state), and when the front portion of the switching switch 100 is pressed, the pair of support tabs 100B become aligned in a tilted forward state (a position in which the link pin 104 is displaced toward the rear with respect to the boss portion 100A), the interlocking slider 96 is positioned at the rear side movement limit (lifter selected state).

Furthermore, there is a spring anchoring tab 100C that extends down from the switching switch 100 in front of the pair of support tabs 100B, and the rear end of a tension coil spring 106 that is in an extended state is anchored to the spring anchoring tab 100C, the front end of the tension coil spring 106 being anchored to the spring anchoring protrusion 86E. The biasing force of this tension coil spring 106 biases the interlocking slider 96 to the front side movement limit.

Therefore, the switching mechanism 75, similar to the switching mechanism 50, normally (when the switching switch 100 is in the non-operation position) takes up the recliner selected state, and by pressing operation of the front portion of the switching switch 100 against the biasing force of the tension coil spring 106, switches to the lifter selected state. Thereby, the operation lever 76 normally takes up a predetermined non-operation position, a neutral position, positioned along the front-rear direction, by the reclining load transmission arm 80 being engaged to the stopper 83 by the biasing force of the torsion spring 82.

Figure 10:
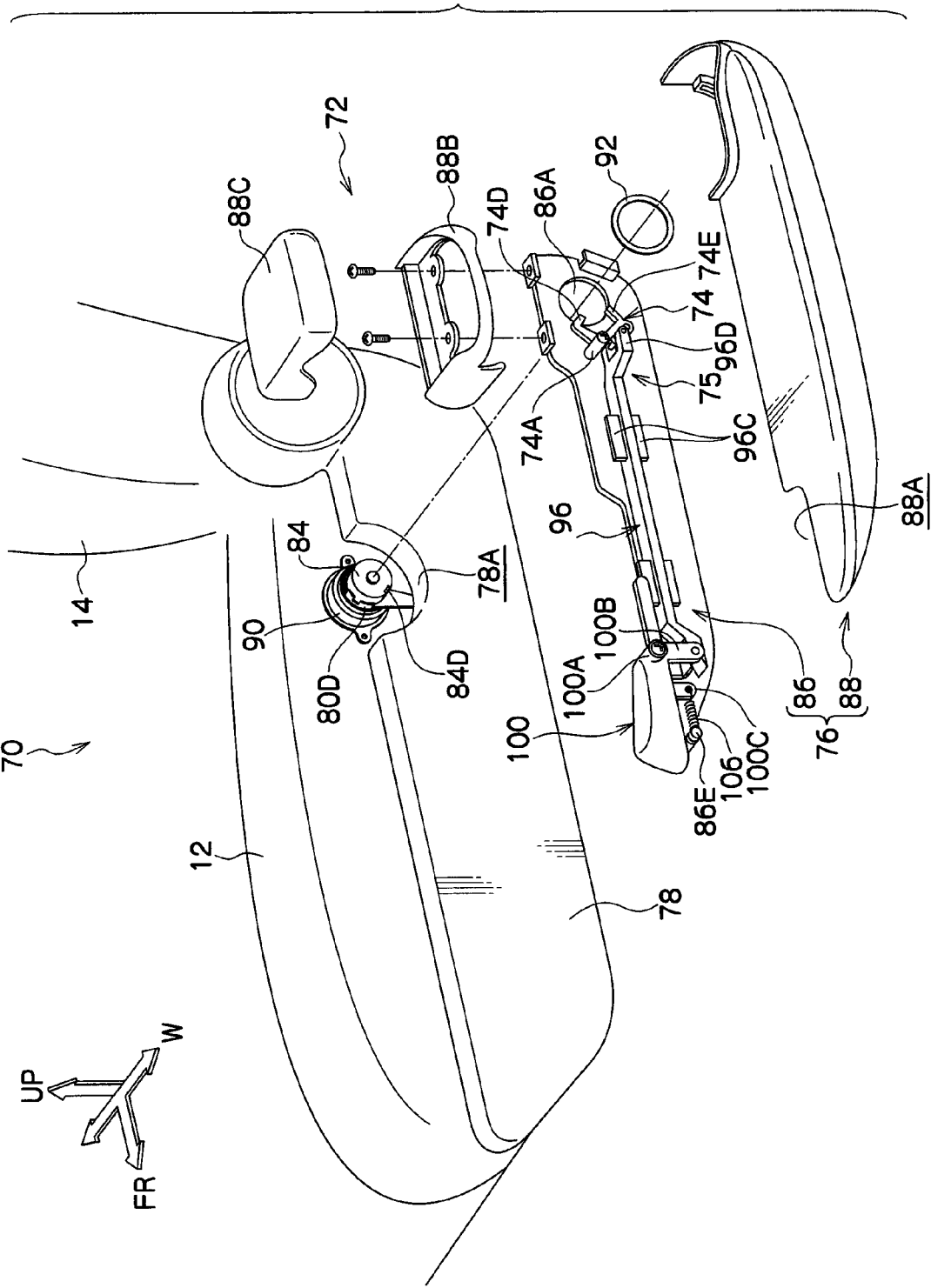
FIG. 10 is an exploded perspective view of relevant portions of a vehicle seat according to the second exemplary embodiment of the present invention.

The above explained switching switch 100 of the switching mechanism 75, as shown in FIG. 10, is disposed so as to protrude out from the top side of a cutout 88A that is formed in a portion to the inside in the width direction in the handle portion 88, such that it is operable by being pressed down by a seat occupant (the thumb thereof). The rear end portion of the handle portion 88 which is inserted into a recess 78A in the outer shield 78 so as to be rotatable in the direction of arrow D and the direction of arrow E, as shown in FIG. 12, is constructed from 3 pieces, as shown in FIG. 10, an intermediate frame body 88B and a rear cover body 88C thereof also covering the top side of the portion that is inserted into the recess 78A of the outer shield 78 of the operation lever 76 (mechanism thereof).

Explanation will now be given of the operation of the second exemplary embodiment.

In the vehicle seat 70 configured as described above, when a seat occupant is adjusting the height of the vehicle seat 70 in the direction to increase the seating height of a seat occupant, the seat occupant, for example, grips the handle portion 88 of the operation lever 76 and also, while pressing the switching switch 100 to the handle portion 88 inside with their thumb or the like, that is to say while switching the switching mechanism 75 to the lifter selected state, the seat occupant swings (reciprocating rotation) the operation lever 76 between the neutral position and the upper operation position. Within the operations of the operation lever 76, the operation force that accompanies movement toward the upper operation position from the neutral position, is transmitted through the switching engagement member 74, and through the lifter load transmission member 84 that is engaged at the switching engagement portion 84D by the cutout 84E being intruded into by the insertion fitting portion 74E, to the pump lifter mechanism 22F, namely to the seat lifter 22, and the seat cushion 12, namely the vehicle seat 10, is displaced overall upward. When operation of the operation lever 76 is stopped at the desired height, the height of the seat cushion 12 is maintained at the adjusted height by the seat lifter 22.

In a similar manner, when a seat occupant is adjusting in the direction to decrease the seating height of a seat occupant, the seat occupant, for example, grips the handle portion 88 of the operation lever 76 and also, while pressing the switching switch 100 to the handle portion 88 inside with their thumb or the like, that is to say while switching the switching mechanism 75 to the lifter selected state, the seat occupant swings (reciprocating rotation) the operation lever 76 between the neutral position and the lower operation position. Within the operations of the operation lever 76, the operation force that accompanies movement toward the lower operation position from the neutral position is transmitted through the switching engagement member 74, and through the lifter load transmission member 84 that is engaged at the switching engagement portion 84D by the cutout 84E being intruded into by the insertion fitting portion 74E, to the pump lifter mechanism 22F, namely to the seat lifter 22, and the seat cushion 12, namely the vehicle seat 10, is displaced overall downward. When operation of the operation lever 76 is stopped at the desired height, the height of the seat cushion 12 is maintained at the adjusted height by the seat lifter 22.

On the other hand, when a seat occupant is adjusting the angle of the seat back 14 with respect to the seat cushion 12, the seat occupant does not operate the switching switch 100, that is to say with the state remaining that of the recliner selected state, but puts their fingers around the handle portion 88 of the operation lever 76, or grips the handle portion 88, and pulls the front portion of the handle portion 88 upward. By doing so, the operation force accompanying the rotation of the operation lever 76 in the direction of arrow D is transmitted from the insertion fitting portion 74D inserted into the cut out portion 80E in the switching engagement member 74, through the switching engaging portion 80D, to the reclining load transmission arm 80. This displaces the engagement portion 80A of the reclining load transmission arm 80 in substantially the front direction, and the cable 35A is pulled out from the cover portion 35B. Thereby, the cable 35A that is relatively displacing with respect to the cover portion 35B rotates the lock release arm 20F in the direction of arrow A, and the lock of the reclining mechanism 20 is released.

The seat occupant places their body weight against the seat back 14, tilts the seat back 14 backward, and stops at the desired position, or stops the seat back 14, which is swinging up with the biasing force of the return spring, at the desired position. When the seat occupant releases the operation force from the reclining lever 76, the reclining mechanism 20 returns to the locked state by the biasing force of the torsion spring 20E, and the reclining lever 76 returns to the non-operation position by the biasing force of the torsion spring 82.

In the vehicle seat 70, as explained above, since the main difference is simply that the structure for switching the destination of the operation force from the operation lever 76 is the switching mechanism 75, rather than the switching mechanism 50, the operational effects of the operation force imparting unit 72 are similar to those of the operation force imparting unit 28 according to the first exemplary embodiment. Therefore, by the vehicle seat 70 according to the second exemplary embodiment, the similar effects may be obtained as by using the vehicle seat 10 according to the first exemplary embodiment.

Third Exemplary Embodiment

Explanation will now be given of a vehicle seat 110 according to a third exemplary embodiment of the present invention, with reference to the FIGS. 13 to 17. In FIG. 17 is shown a perspective view of the overall configuration of a vehicle seat 110 according to the third exemplary embodiment, in FIG. 13 is shown an exploded perspective view of an operation force imparting unit 112 configuring the vehicle seat 110. As is shown in these figures, the switching switch 100 is mainly different in that the member (lock link 132, described later) for transmitting load to the reclining mechanism 20 in the recliner selected state and the member (lifter engagement pin 144A, described later) for transmitting load to the seat lifter 22 in the lifter selected state are provided, instead of the single switching engaging member 52 or switching engagement member 74, for switching the recliner selected state and the lifter selected state in each of the above exemplary embodiments.

As shown in FIG. 13, in this exemplary embodiment there is no lock release arm 20F provided to the reclining mechanism 20, and a lock release link 114 configuring the operation force imparting unit 112 is connected to the reclining mechanism 20 by a reclining hinge pin 116 (reclining shaft 20B) such that lock release of the lock connecting portion 20D is possible by the lock release link 114 rotating in the direction of arrow A. Other parts of the configuration of the reclining mechanism 20 are the same as those of the reclining mechanism 20 of the first or the second exemplary embodiment. The lock release link 114, in the locked state of the lock connecting portion 20D, takes up an inclined position with the front end thereof positioned to the front bottom side relative to the rear end that is connected to the reclining mechanism 20.

This lock release link 114 is configured including: a leg portion 114A, which is provided extending down along the vertical direction from an intermediate portion of the lock release link 114 when positioned in the position described above; and a link support portion 114B, provided extending along the horizontal direction from the bottom end of the leg portion 114A.

Furthermore, the operation force imparting unit 112 is provided with a lifter lever 120 that is fixed at the rear end thereof to the pump lifter mechanism 22F by screws 118. The lifter lever 120 is rotatable coaxially and as one with the pump lifter mechanism 22F in the direction of arrow D and the direction of arrow E. Also, there is a cutout portion 120A, described later, formed to the front end of the lifter lever 120.

In the operation force imparting unit 112 there is provided an operation lever 122, serving as a single operation member for independently operating the reclining mechanism 20 and the seat lifter 22. The operation lever 122 is configured with a lever body 124, and a handle portion 126 that covers a portion of the lever body 124 and has an operation portion for operation by a seat occupant and a decorative portion. As shown in FIG. 13, the lever body 124 is long in the front-rear direction, and a portion at the rear end thereof is connected through a link pin 128, to the front end of the lock release link 114 so as to be able to relatively angularly displace thereto.

Figure 14C:
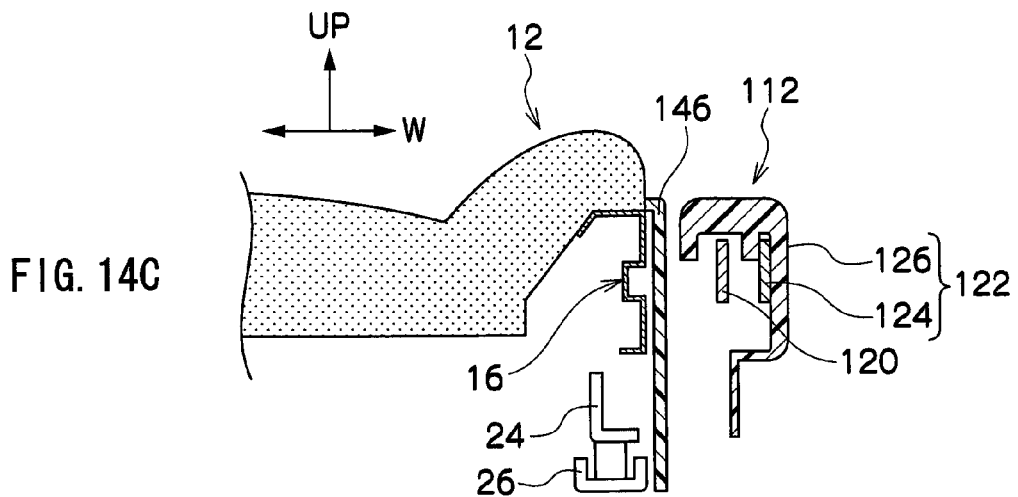
FIG. 14C is a front view schematically showing an operation force imparting unit of a vehicle seat according to the third exemplary embodiment of the present invention.
Figure 15A:
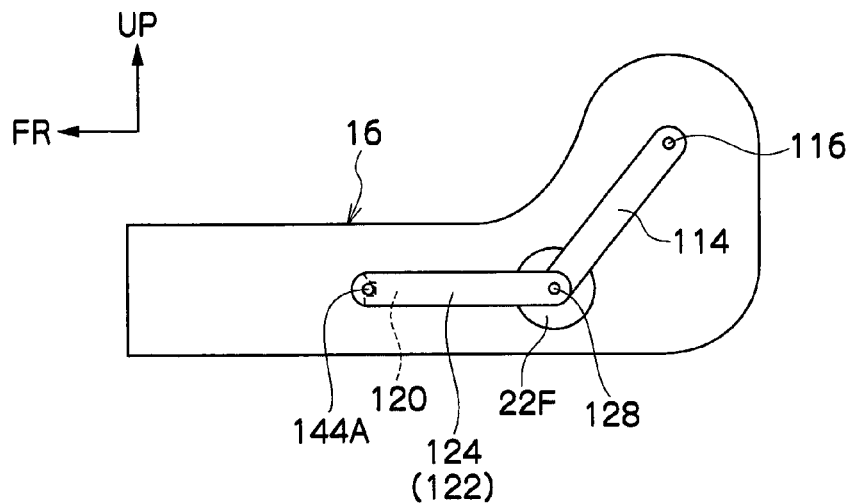
FIG. 15A is a side view schematically showing a non-operation state of an operation force imparting unit of a vehicle seat according to the third exemplary embodiment of the present invention.

As shown in FIG. 15A, in the locked state of the reclining mechanism 20 the link pin 128 is disposed coaxially to the pump lifter mechanism 22F. By so doing, the lever body 124 is able to take up: a state of rotating coaxially to the pump lifter mechanism 22F (relative angularly displacement with respect to the lock release link 114); and a state of rotating together with the lock release link 114 about the reclining hinge pin 116. As shown in FIG. 14C the lever body 124 is disposed to the outside in the seat width direction with respect to the lifter lever 120.

The operation force imparting unit 112 is also provided with a switching mechanism 130 for selectively switching between the recliner selected state, in which operation force from the lever body 124 is transmitted to the lock release link 114, and the lifter selected state, in which operation force from the lever body 124 is transmitted to the lifter lever 120. The switching mechanism 130 is provided with the lock link 132 for switching between a state in which relative angular displacement of the lock release link 114 and the lever body 124 is locked, and a state in which the lock is released.

The lock link 132 is configured with: an arm 132A, which is long in the seat width direction; and an arm 132B, which is provided extending toward the front from the width direction outside end of the arm 132A; a standing arm 132C, which is provided standing up from the front end of the arm 132B; an engagement pawl 132D, which is provided protruding to the inside in the width direction from the top end of the standing arm 132C; a switching load input portion 132E that is formed to the inside end in the width direction of the arm 132A; and a shaft support portion 132F that is formed to an intermediate portion in the length direction of the arm 132A.

The lock link 132 is connected at the shaft support portion 132F to the link support portion 114B of the lock release link 114, through a link bolt 134, so as to be able to rotate about the link bolt 134. The lock link 132 is prevented from coming off from the lock release link 114 by a nut 136 that is screwed onto the link bolt 134. The lock link 132 is able, as shown in FIG. 14B, to insert into, or withdraw, the engagement pawl 132D from an engagement hole 124A that is formed in the lever body 124.

Figure 14A:
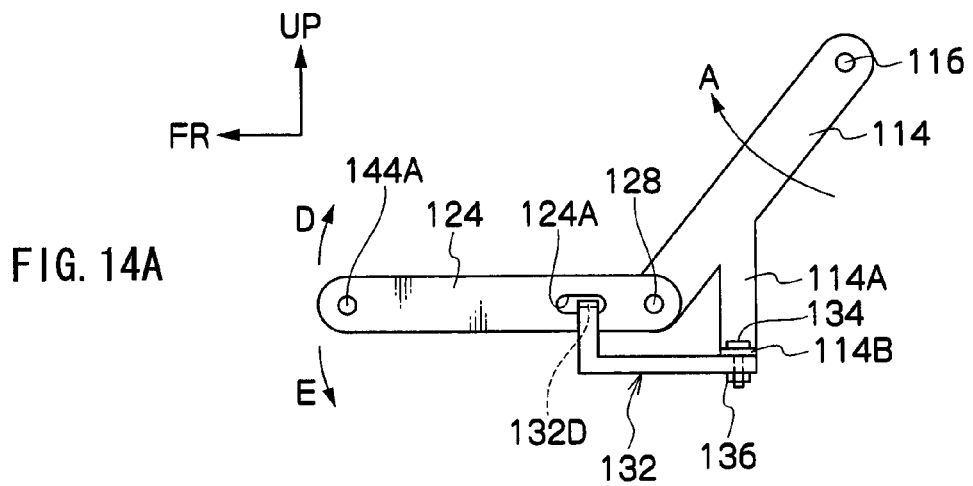
FIG. 14A is a side view schematically showing an operation force imparting unit of a vehicle seat according to the third exemplary embodiment of the present invention.
Figure 14B:
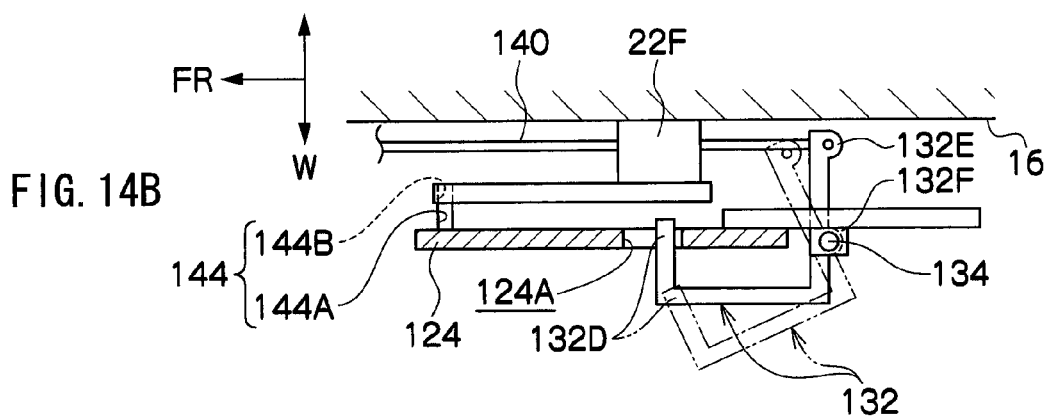
FIG. 14B is a plan view schematically showing an operation force imparting unit of a vehicle seat according to the third exemplary embodiment of the present invention.
Figure 15B:
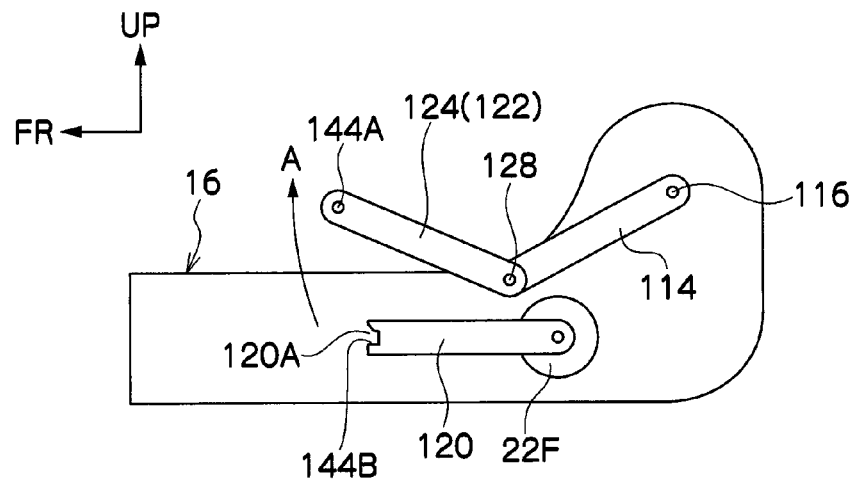
FIG. 15B is a side view schematically showing a recliner operation state of an operation force imparting unit of a vehicle seat according to the third exemplary embodiment of the present invention.
Figure 15C:
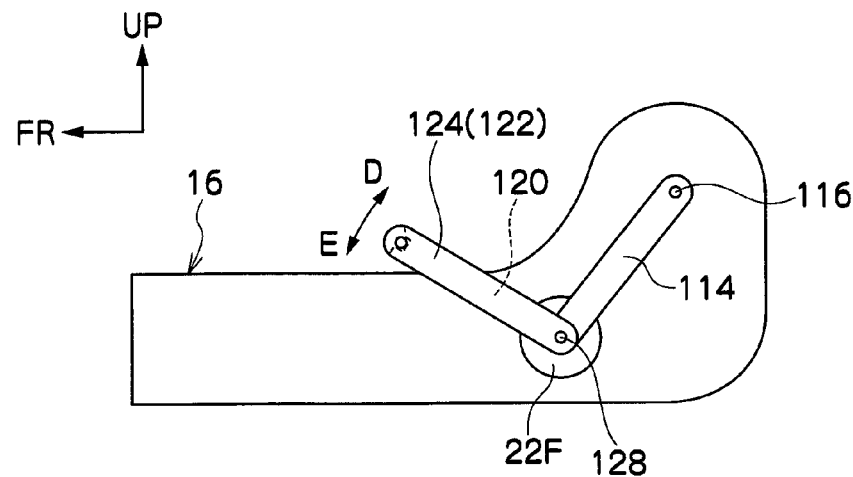
FIG. 15C is a side view schematically showing a lifter operation state of an operation force imparting unit of a vehicle seat according to the third exemplary embodiment of the present invention.

As shown in FIGS. 14A and 14B, in the recliner selected state in which the engagement pawl 132D is intruded into the engagement hole 124A, the lever body 124 is prevented from angular displacement with respect to the lock release link 114, and, as shown in FIG. 15B, when the front end of the lever body 124 is operated upward, the lever body 124 rotates as one with the lock release link 114 about the reclining hinge pin 116 in the direction of arrow A. On the other hand, in the lifter selected state in which the engagement pawl 132D is removed from the engagement hole 124A, the lever body 124, as shown in FIG. 15C, is able to rotate about the rotational axis of the pump lifter mechanism 22F relative to the lock release link 114. A torsion spring 138 is provided disposed between the link support portion 114B and the shaft support portion 132F, and the lock link 132 is biased by the biasing force of the torsion spring 138 to the position in which the engagement pawl 132D is intruded into the engagement hole 124A.

The rear end of a push rod 140, serving as an interlocking portion, which is long in the front-rear direction, is anchored at the switching load input portion 132E of the lock link 132. There is a switching switch 142, which is mounted to the handle portion 126, connected to the front end of the vehicle seat 140 (the connection portion is omitted in the figures). The switching switch 142 has an operation portion 142A that passes through a switch hole 126A formed to a front portion of the handle portion 126, and the operation portion 142A is exposed so as to be slidable in the front-rear direction by operation of a seat occupant. This switching switch 142 is biased toward the rear side movement limit and is normally engaged with the rear edge of the switch hole 126A, due to the biasing force from the torsion spring 138 transmitted through the push rod 140, and it is configured such that when the operation portion 142A is operated toward the front against the biasing force of the torsion spring 138, the push rod 140 is urged toward the front and the engagement pawl 132D of the lock link 132 is removed from the engagement hole 124A.

In the switching mechanism 130 there is also provided a selectable engagement portion 144 such that in the recliner selected state, when the lever body 124 rotates with the lock release link 114 in the direction of arrow A, there is no impinging with the lifter lever 120, and when in the lifter selected state and the lever body 124 rotates relative to the lock release link 114 in the direction of arrow D or direction of arrow E, the lifter lever 120 follows the lever body 124.

In this exemplary embodiment, the selectable engagement portion 144 is configured with a lifter engagement pin 144A, provided so as to protrude to the inside in the width direction from the front end of the lever body 124; and pin engagement portions 144B, formed as edge portions of the cutout portion 120A that is open toward the front at the front end of the lifter lever 120. The lifter engagement pin 144A, as shown in FIG. 16, is positioned inside the cutout portion 120A in the non-operation state of the operation lever 122 (lever body 124). Thereby, when the lever body 124 rotates about the axis of the pump lifter mechanism 22F (link pin 128) in the direction of arrow D or the direction of arrow E, the lifter engagement pin 144A engages with the pin engagement portions 144B that are the top and bottom edge portions of the cutout portion 120A, and the lifter lever 120 is rotated, following the lever body 124, in the direction of arrow D or the direction of arrow E.

There is an escape portion 144C formed continuous to the cutout portion 120A at the engaging wall at the top side of the pin engagement portion 144B, such that when the lever body 124 rotates about the reclining hinge pin 116 in the direction of arrow A, the lifter engagement pin 144A does not interfere with that rotation. Namely, by using the difference in the rotational axes (rotational paths) of the lever body 124 between that in the recliner selected state and to that in the lifter selected state, the lifter lever 120 is configured to switch between following, or not following, the lever body 124, without an during switching operation.

Furthermore, since normally the lifter engagement pin 144A is intruded into the cutout portion 120A so as to be engageable with the pin engagement portion 144B, the operation lever 122 is normally held in the neutral position, non-operation position (state) for the pump lifter mechanism 22F.

The operation force imparting unit 112, as shown in FIG. 13, is provided disposed to the outside in the width direction of the seat cushion frame 16, and, except for portions thereof such as the lever body 124 that are covered by the handle portion 126, and the operation force imparting unit 112 is covered from the outside in the width direction by a cover 146, as shown in FIG. 17.

Explanation will now be given of the operation of the third exemplary embodiment.

In the above described vehicle seat 110, when a seat occupant is adjusting the vehicle seat 110 in the direction to increase the seating height of a seat occupant, the seat occupant, for example, grips the handle portion 126 of the operation lever 122 and while pressing the operation portion 142A of the switching switch 142 to the front, that is to say while switching the switching mechanism 130 to the lifter selected state, the seat occupant swings (reciprocating rotation) the operation lever 122 between the neutral position and the upper operation position. Within the operations of the operation lever 122, the operation force that accompanies movement toward the upper operation position from the neutral position, is transmitted through the selectable engagement portion 144 and the lifter lever 120, to the pump lifter mechanism 22F, namely to the seat lifter 22, and the seat cushion 12, namely the vehicle seat 10, is displaced overall upward. When operation of the operation lever 122 is stopped at the desired height, the height of the seat cushion 12 is maintained at the adjusted height by the seat lifter 22.

In a similar manner, when a seat occupant is adjusting in the direction to decrease the seating height of a seat occupant, the seat occupant, for example, grips the handle portion 126 of the operation lever 122 and while pressing the operation portion 142A of the switching switch 142 to the front, that is to say while switching the switching mechanism 130 to the lifter selected state, the seat occupant swings (reciprocating rotation) the operation lever 122 between the neutral position and the lower operation position. Within the operations of the operation lever 122, the operation force that accompanies movement toward the lower operation position from the neutral position is transmitted, through the selectable engagement portion 144 and the lifter lever 120, to the pump lifter mechanism 22F, namely to the seat lifter 22, and the seat cushion 12, namely the vehicle seat 10, is displaced overall downward. When operation of the operation lever 122 is stopped at the desired height, the height of the seat cushion 12 is maintained at the adjusted height by the seat lifter 22.

On the other hand, when a seat occupant is adjusting the angle of the seat back 14 with respect to the seat cushion 12, the seat occupant does not operate the switching switch 142, that is to say with the state remains that of the recliner selected state, but puts their fingers around the handle portion 126 of the operation lever 122, or grips the handle portion 126, and pulls the front portion of the handle portion 126 upward. By doing so, the operation lever 122 rotates with the lock release link 114 in the direction of arrow A. Namely, by operation of the operation lever 122, the selectable engagement portion 144 is rotated directly in the direction of arrow A, and the lock of the reclining mechanism 20 is released.

As explained above, since the main difference is that since the main difference is simply that the structure for switching the destination of the operation force in the vehicle seat 110 is the switching mechanism 130, rather than the switching mechanism 50, the operational effects of the operation force imparting unit 112 are similar to those of the operation force imparting unit 28 according to the first exemplary embodiment. Therefore, by the vehicle seat 110 according to the third exemplary embodiment, except that the rotational path of the operation lever 122 is different, similar effects may be obtained as by using the vehicle seat 10 according to the first exemplary embodiment. Furthermore, as described above, the rotational path of the operation lever 122 in the recliner selected state is a rotational path about the reclining hinge pin 116, but in that the operation of the operation lever 122 is upward in the recliner selected state it is the same, therefore good operability is achieved in the present exemplary embodiment.

It should be noted that in each of the above exemplary embodiments, examples were given in which the operation lever 30, 76, 122 were rotatable about an axis along the seat width direction (pump lifter mechanism 22F, reclining hinge pin 116), however, the present invention is not limited thereto, and, for example, the operation lever 30 and the like, may be configured to switch between the recliner selected state and the lifter selected state by rotation about an axis that is along the front-rear direction.

Also, in each of the above described exemplary embodiments, examples where given in which the seat lifter 22 was provided as the first adjustable unit, and the reclining mechanism 20 was provided as the second adjustable unit, however, the present invention is not limited thereto, and, for example, other adjustable units may be operated by the operation lever 30 and the like. Examples that may be given of other adjustable units include a seat front portion tilt mechanism for adjusting the height of the front portion of the seat cushion 12 relative to the back portion thereof, or a seat plane angle adjusting mechanism for adjusting the seat plane angle relative to the floor.

Also, in each of the above exemplary embodiments, examples have been given of the present invention as applied to vehicle seats 10, 70, 110, however, the present invention is not limited thereto, and the present invention may be applied to various passenger seats and leisure chairs, as well as office chairs.

The invention claimed is:

1. A seat comprising:
   a first adjustable unit, provided to a seat body that is for sitting on, the first adjustable unit being adjusted by transmitted operation force;
   a second adjustable unit, provided to the seat body, the second adjustable unit being adjusted by transmitted operation force;
   an operation member, input with operation force from operation by a seat occupant; and
   a switching device, configured to selectively take up a first state, in which operation force of the operation member is able to be transmitted to the first adjustable unit, and a second state, in which operation force of the operation member is able to be transmitted to the second adjustable unit,
   wherein the switching device comprises:
      a switching operation portion that is provided to the operation member,
      a force transmission portion, engaging in the first state so that operation force is transmittable to an operation force input portion of the first adjustable unit, and engaging in the second state so that operation force is transmittable to an operation force input portion of the second adjustable unit, and
      an interlocking portion, connecting the switching portion and the force transmission portion, and switching the force transmission portion between being in the first state or being in the second state according to the operation state of the switching operation portion;
   wherein the operation force input portion of the first adjustable unit comprises a first arm that is able to rotate about an axis along the seat width direction;
   wherein the operation force input portion of the second adjustable unit comprises a second arm that is able to rotate about an axis that is parallel to the rotational axis of the first arm;
   wherein the operation member is connected to a portion of the second arm that is separated from the rotational axis of the second arm so as to allow relative angular displacement with respect to the second arm, and in a non-operation position the operation member is disposed so that the portion connected to the second arm is coaxial to the rotational axis of the first arm; and
   wherein the force transmission portion of the switching device comprises:
      a first engaging portion that in the first state permits relative angular displacement of the operation member with respect to the second arm and in the second state restricts relative angular displacement of the operation member with respect to the second arm, and
      a second engaging portion that is provided between the operation member and the first arm, and that engages with the first arm when the operation member rotates about the rotational axis of the first arm, and that has engagement with the first arm released when the operation member rotates about the rotational axis of the second arm.

2. The seat according to claim 1, wherein the interlocking portion is configured such that a displacement direction of the force transmission portion during switching between the first state and the second state is different from the operation direction of the switching operation member.

3. The seat according to claim 1, wherein, in the force transmission portion, the portion thereof engaging the first adjustable unit in the first state is different from the portion thereof engaging the second adjustable unit in the second state.

4. The seat according to claim 1, wherein:
   one of the first adjustable unit or the second adjustable unit is a height adjustment mechanism for adjusting the position in the up-down direction of the seat body; and
   the other of the first adjustable unit or the second adjustable unit is a reclining mechanism for switching between a locked state of an angle of a seat back with respect to a seat cushion, and a lock released state thereof.

5. The seat according to claim 4, wherein:
   the operation member is disposed to the outside of the seat body in the seat width direction, so as to operate the height adjusting mechanism by operating in the seat up-down direction, and so as to operate the reclining mechanism by operating in the seat up direction.

6. The seat according to claim 4, wherein the switching device switches between a switching state maintaining a non-operation state of the switching operation portion in which operation force of the operation member is able to be transmitted to the reclining mechanism, and a state in which the switching operation portion is operated and the operation force of the operation member is able to be transmitted to the height adjusting mechanism.

* * * * *